United States Patent
Scadden

(10) Patent No.: US 7,412,147 B2
(45) Date of Patent: Aug. 12, 2008

(54) NORMAL THROUGH OPTICAL PANEL

(75) Inventor: Jarrod Charles Scadden, Waconia, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 25 days.

(21) Appl. No.: 11/080,141

(22) Filed: Mar. 15, 2005

(65) Prior Publication Data

US 2006/0210229 A1      Sep. 21, 2006

(51) Int. Cl.
G02B 6/00      (2006.01)

(52) U.S. Cl. .................................... 385/135; 385/134

(58) Field of Classification Search ................ 385/135, 385/134, 139
See application file for complete search history.

(56) References Cited

U.S. PATENT DOCUMENTS

| | | | |
|---|---|---|---|
| 3,668,476 A | 6/1972 | Wrabel | |
| 5,189,410 A | 2/1993 | Kosugi et al. | |
| 5,363,465 A | 11/1994 | Korkowski et al. | |
| 5,432,875 A | 7/1995 | Korkowski et al. | |
| 5,627,925 A | 5/1997 | Alferness et al. | |
| 5,943,461 A * | 8/1999 | Shahid | 385/92 |
| 6,208,796 B1 | 3/2001 | Williams Vigliaturo | |
| 6,226,111 B1 | 5/2001 | Chang et al. | |
| 6,263,136 B1 * | 7/2001 | Jennings et al. | 385/48 |
| 6,363,183 B1 | 3/2002 | Koh | |
| 6,370,294 B1 | 4/2002 | Pfeiffer et al. | |
| 6,418,262 B1 | 7/2002 | Puetz et al. | |
| 6,556,738 B2 * | 4/2003 | Pfeiffer et al. | 385/16 |
| 6,614,953 B2 | 9/2003 | Strasser et al. | |
| 6,668,108 B1 | 12/2003 | Helkey et al. | |
| 6,795,632 B1 * | 9/2004 | Knapp et al. | 385/135 |
| 2002/0181896 A1 | 12/2002 | McClellan et al. | |
| 2003/0210882 A1 * | 11/2003 | Barthel et al. | 385/135 |
| 2004/0161207 A1 * | 8/2004 | Chiu et al. | 385/88 |
| 2005/0232565 A1 * | 10/2005 | Heggestad et al. | 385/135 |
| 2006/0093302 A1 * | 5/2006 | Solheid et al. | 385/135 |

FOREIGN PATENT DOCUMENTS

EP      0 828 356 A2      3/1998

OTHER PUBLICATIONS

U.S. Appl. No. 10/826,152, filed Apr. 16, 2004, 29 pages.

* cited by examiner

*Primary Examiner*—M. R. Connelly-Cushwa
*Assistant Examiner*—Rhonda S Peace
(74) *Attorney, Agent, or Firm*—Merchant & Gould P.C.

(57) ABSTRACT

A fiber optic connection panel including a chassis and a circuit module. The circuit module can include a housing, a plurality of adapters, and a plurality of fiber optic connectors connected to the adapters. The circuit module can also include an optical switch mounted to a printed circuit board, a plurality of fiber optic cables connecting the fiber optic connectors to the optical switch, and a separator plate partially covering the printed circuit board. At least some of the cables can include slack to allow the connectors to be removed from the circuit module, and the separator plate can be positioned to separate the slack of the cables from the printed circuit board. The circuit module can also include a connector edge of the printed circuit board extending through the housing, and a bracket coupled to the housing including members to surround and protect the connector edge.

18 Claims, 28 Drawing Sheets

NORMAL THROUGH OPTICAL PANEL

RELATED APPLICATION

The present application is related to U.S. patent application Ser. No. 10/826,152, filed on Apr. 16, 2004 and entitled "Normal Through Optical Panel," the entirety of which is hereby incorporated.

TECHNICAL FIELD

The present application relates to fiber optic connection panels.

BACKGROUND

Fiber optic connection panels are known which connect various pieces of fiber optic equipment. The fiber optic connection panels include ports for connecting to fiber optic cables, to link the equipment. Various functions are useful in the fiber optic connection panels. One function is monitoring of the signal pathways. Another useful function is switching between equipment if a need arises without having to reconnect the equipment cables. Improvements are desired.

SUMMARY

Embodiments of the present invention provide a fiber optic connection panel with a normal through configuration to link optical equipment. Preferably, the panel has monitor access. The panel can preferably be reconfigured to change the circuit pathways, when desired.

Embodiments of the present invention relate to a fiber optic connection panel including a plurality of circuits. The circuits are accessed through termination locations or ports. Preferably, IN and OUT (or SOURCE and DESTINATION) termination locations are located on a first side of the panel during a normal through state. A switch included in the circuitry disconnects the IN and OUT termination locations, and connects each of the IN and OUT termination locations to further IN and OUT termination locations or ports, located on an opposite side of the panel in a patched state. Preferably, at least one of the circuit paths includes a monitor circuit and a termination location or port.

In one embodiment, a fiber optic connection panel includes a chassis, and a circuit module adapted to be mounted to the chassis. The circuit module includes a housing defining an interior, a plurality of adapters mounted on a front face and a rear face of the housing, a plurality of fiber optic connectors connected to interior ports defined by the adapters, an optical switch mounted to a printed circuit board positioned in the interior of the housing, a plurality of fiber optic cables connecting the fiber optic connectors to the optical switch, and a separator plate positioned to at least partially cover the printed circuit board. At least some of the fiber optic cables include slack to allow the fiber optic connectors coupled thereto to be removed from the circuit module, and the separator plate is positioned to separate the slack of the fiber optic cables from the printed circuit board.

In another embodiment, a normal through circuit module includes a housing defining an interior, a plurality of adapters mounted on a front face and a rear face of the housing, a plurality of fiber optic connectors connected to interior ports defined by the adapters, an optical switch mounted to a printed circuit board positioned in the interior of the housing, a plurality of fiber optic cables connecting the fiber optic connectors to the optical switch, and a separator plate positioned to at least partially cover the printed circuit board. At least some of the fiber optic cables include slack to allow the fiber optic connectors coupled thereto to be removed from the circuit module, and the separator plate is positioned to separate the slack of the fiber optic cables from the printed circuit board.

In yet another embodiment, a normal through circuit module includes a housing defining an interior, a plurality of adapters mounted on a front face and a rear face of the housing, a plurality of fiber optic connectors connected to interior ports defined by the adapters, an optical switch mounted to a printed circuit board positioned in the interior of the housing, a plurality of fiber optic cables connecting the fiber optic connectors to the optical switch, a connector edge defined by a portion of the printed circuit board, wherein the connector edge extends through an aperture defined by the rear face of the housing of the circuit module, and a bracket coupled to the rear face to protect the connector edge.

In another embodiment, a normal through circuit module includes a housing defining an interior, an optical switch mounted to a printed circuit board positioned in the interior of the housing, a connector edge defined by a portion of the printed circuit board, wherein the connector edge extends through an aperture defined by a rear of the housing of the circuit module, and a bracket coupled to the rear to protect the connector edge.

DETAILED DESCRIPTION OF THE PREFERRED EMBODIMENT

Figure 1:
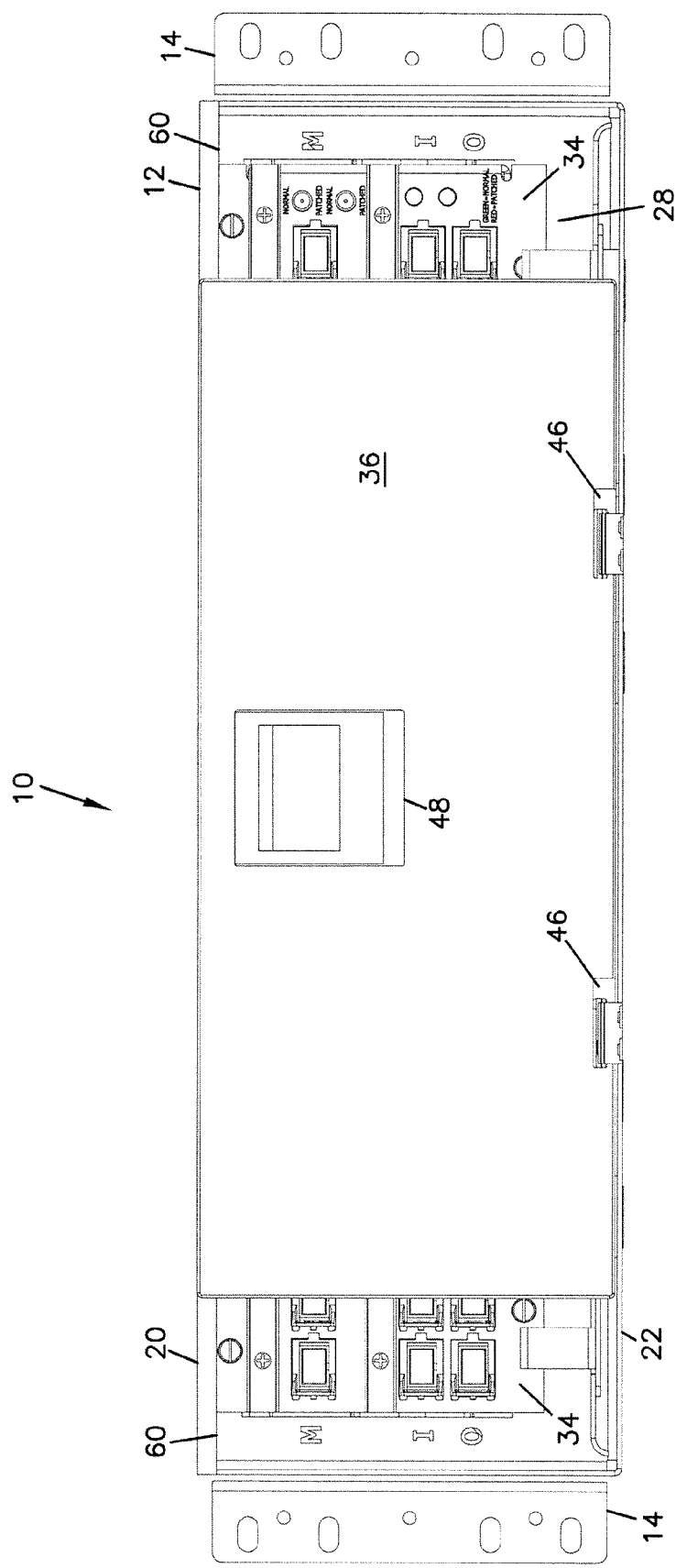
FIG. 1 is a front elevational view of a fiber optic connection panel in accordance with the present invention.
Figure 2:
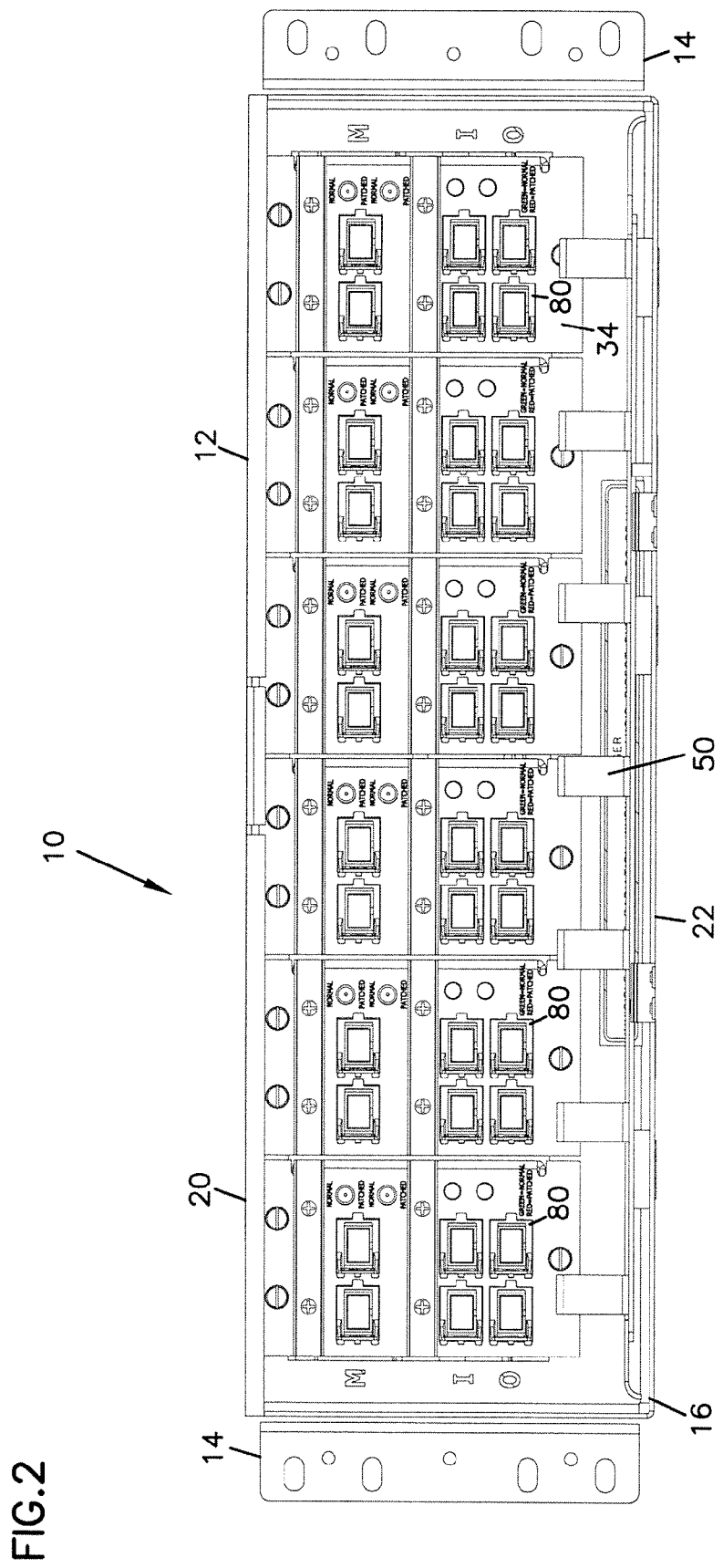
FIG. 2 is a front elevational view of the connection panel of FIG. 1 with the front cover removed.
Figure 3:
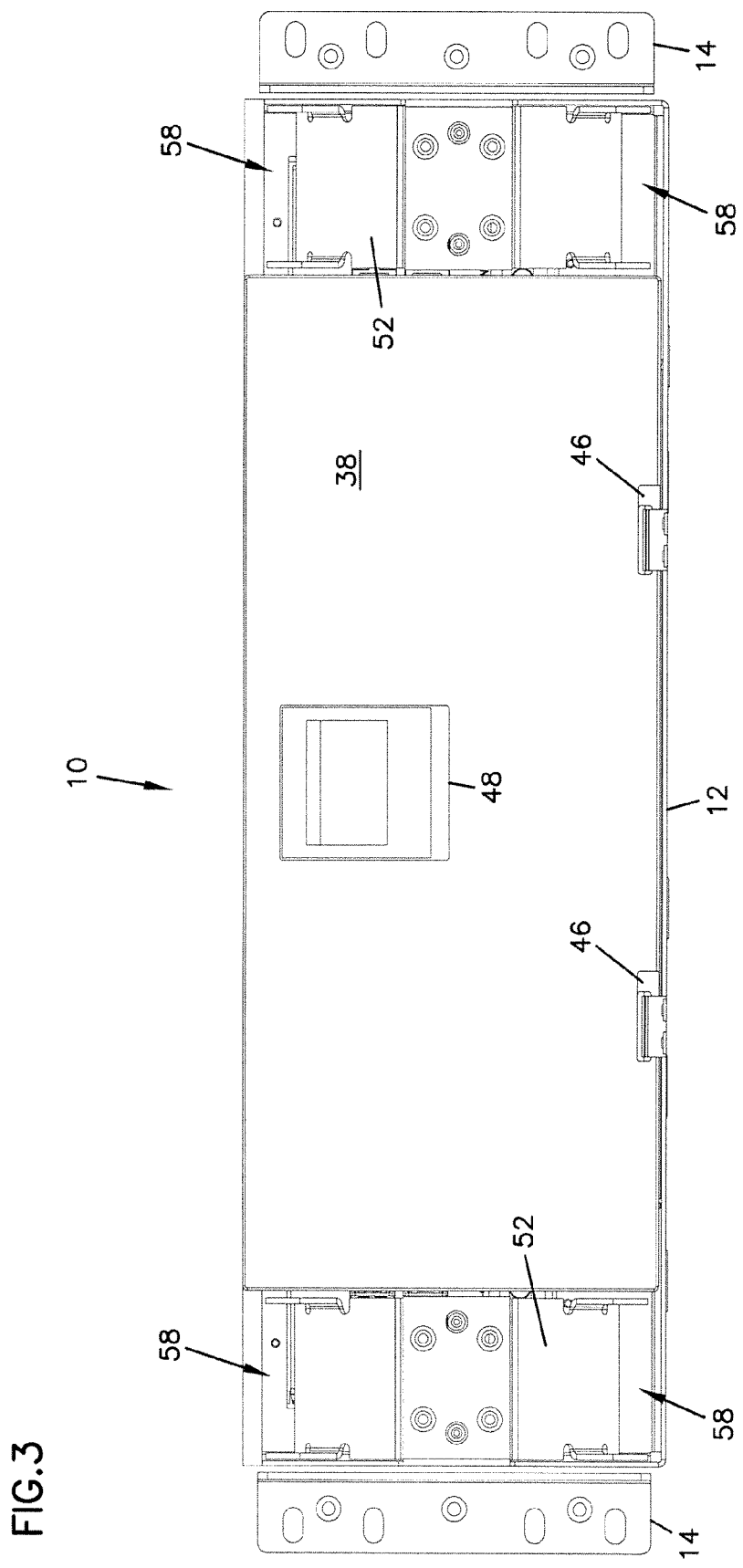
FIG. 3 is a rear elevational view of the connection panel of FIG. 1.
Figure 4:
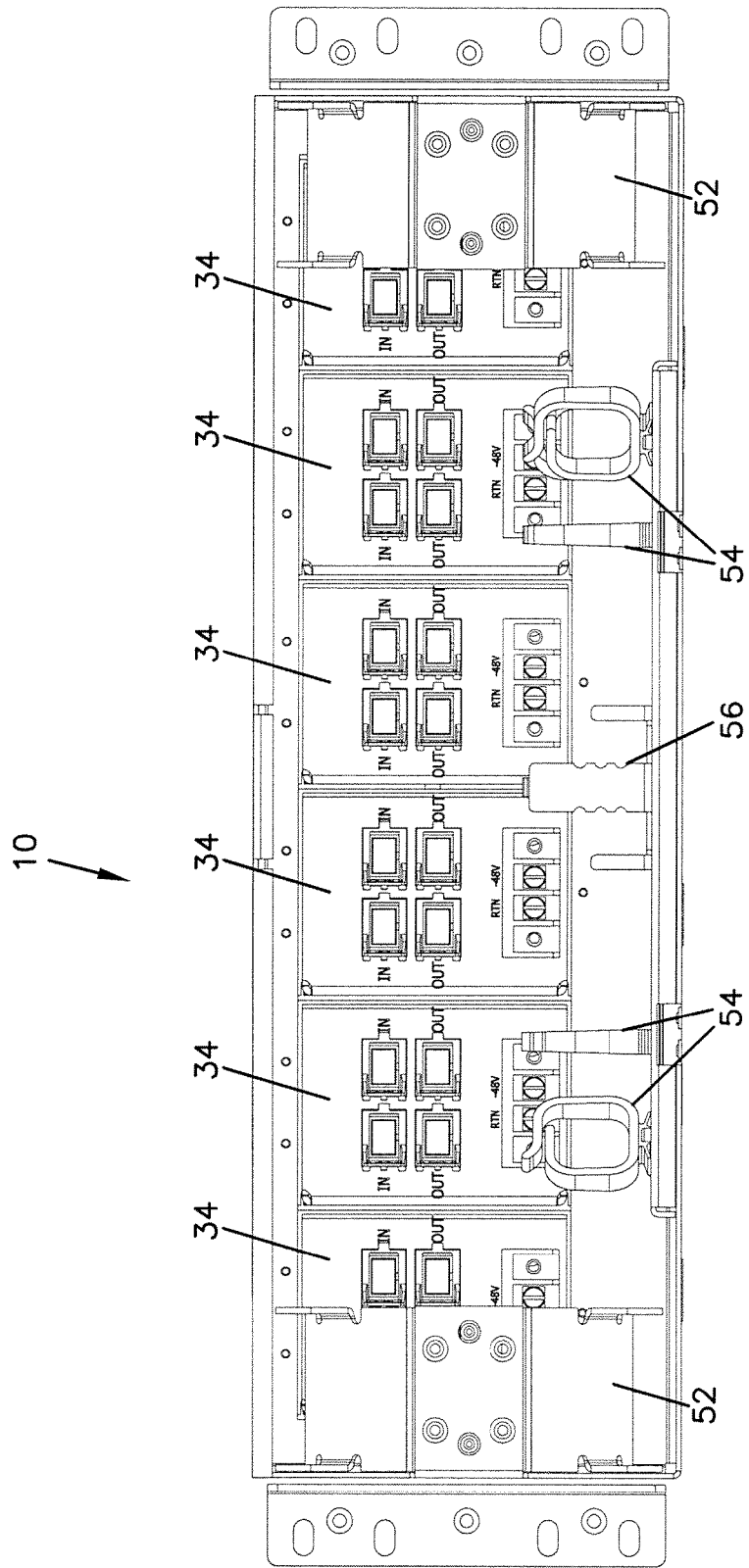
FIG. 4 is a rear elevational view of the connection panel of FIG. 1 with the rear cover removed.
Figure 5:
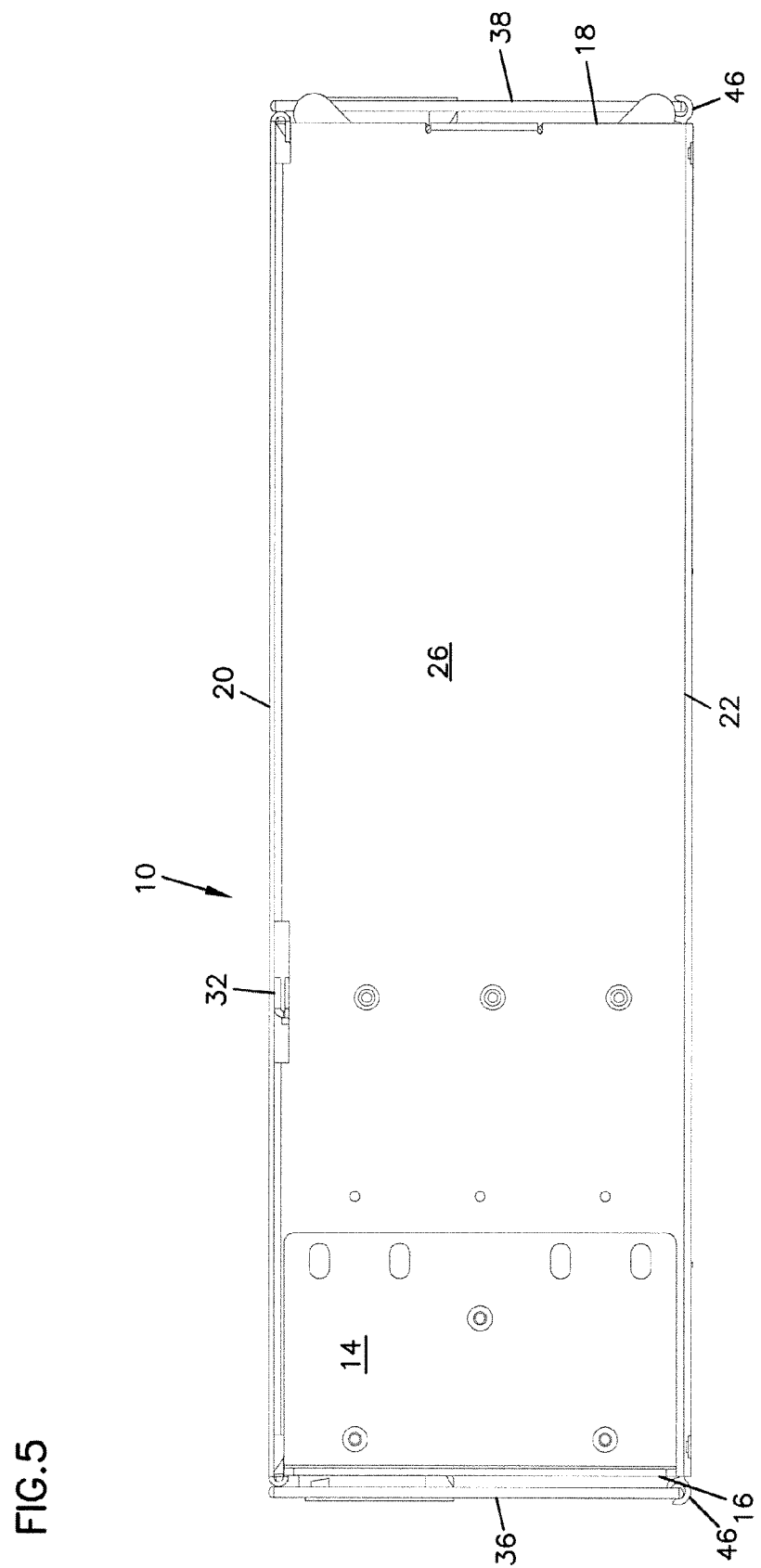
FIG. 5 is a right side elevational view of the connection panel of FIG. 1.
Figure 6:
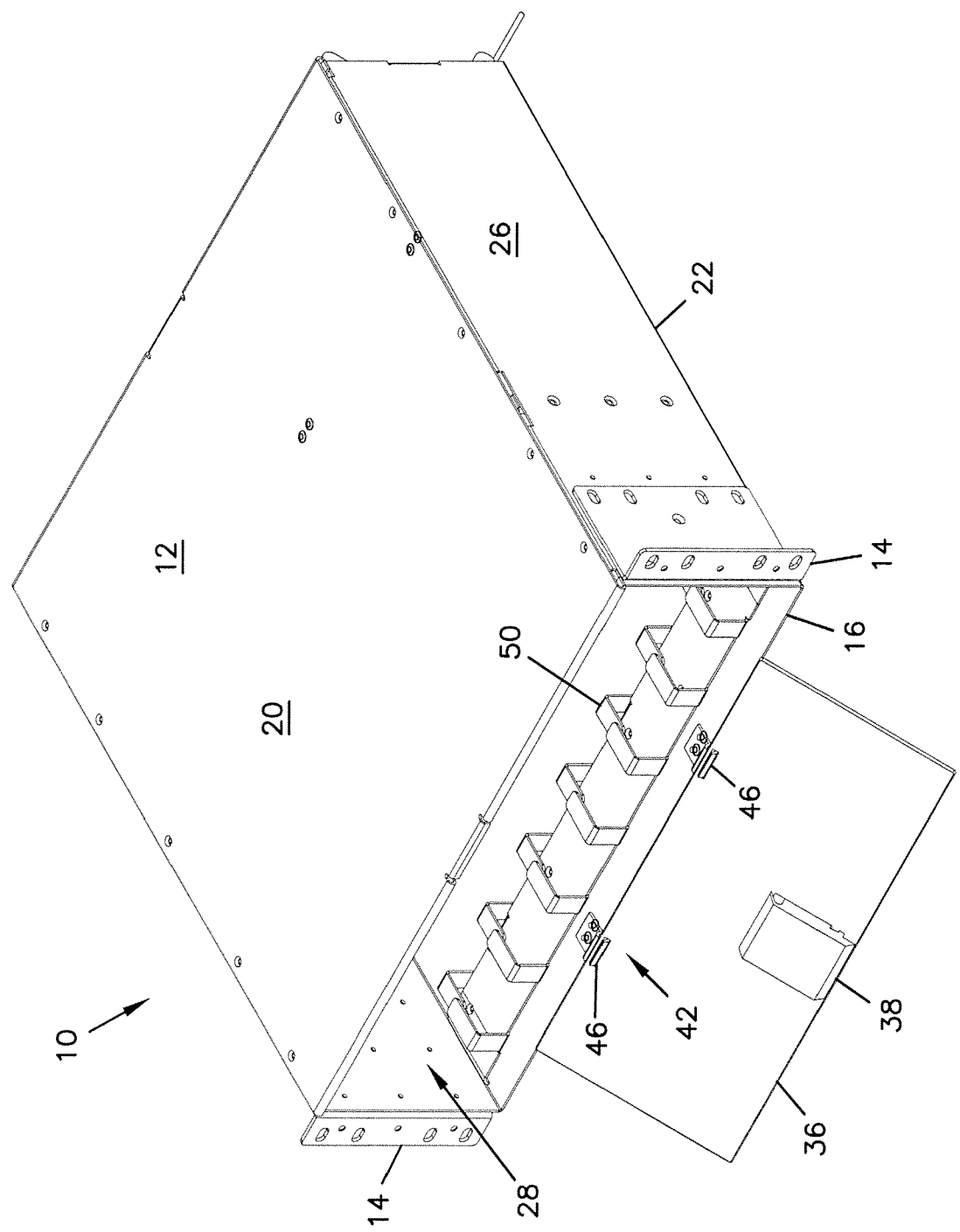
FIG. 6 is a front perspective view of the connection panel of FIG. 1 with the front cover in the pivoted open position.
Figure 7:
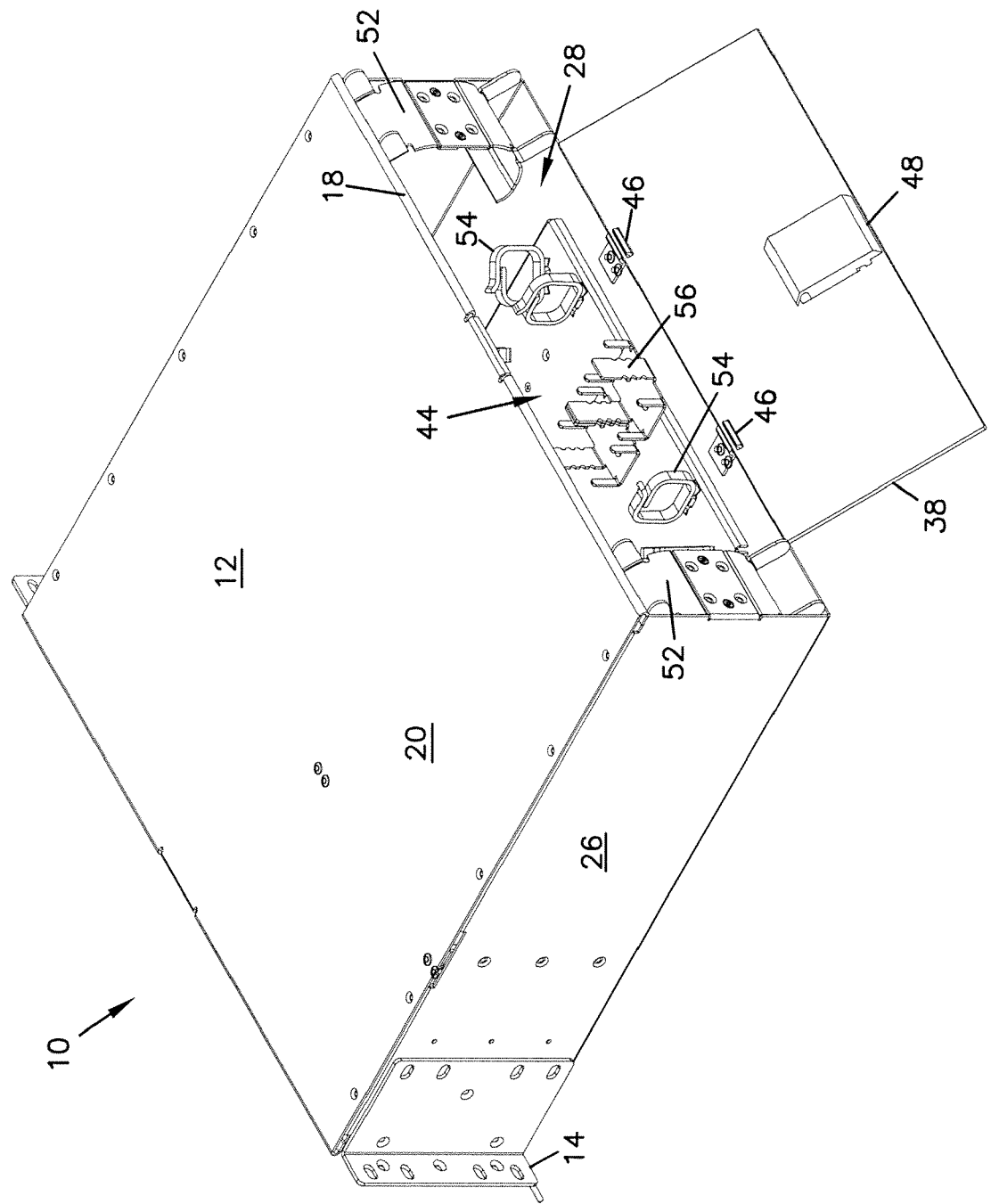
FIG. 7 is a rear perspective view of the connection panel of FIG. 1 with the rear cover in the pivoted open position.
Figure 8:
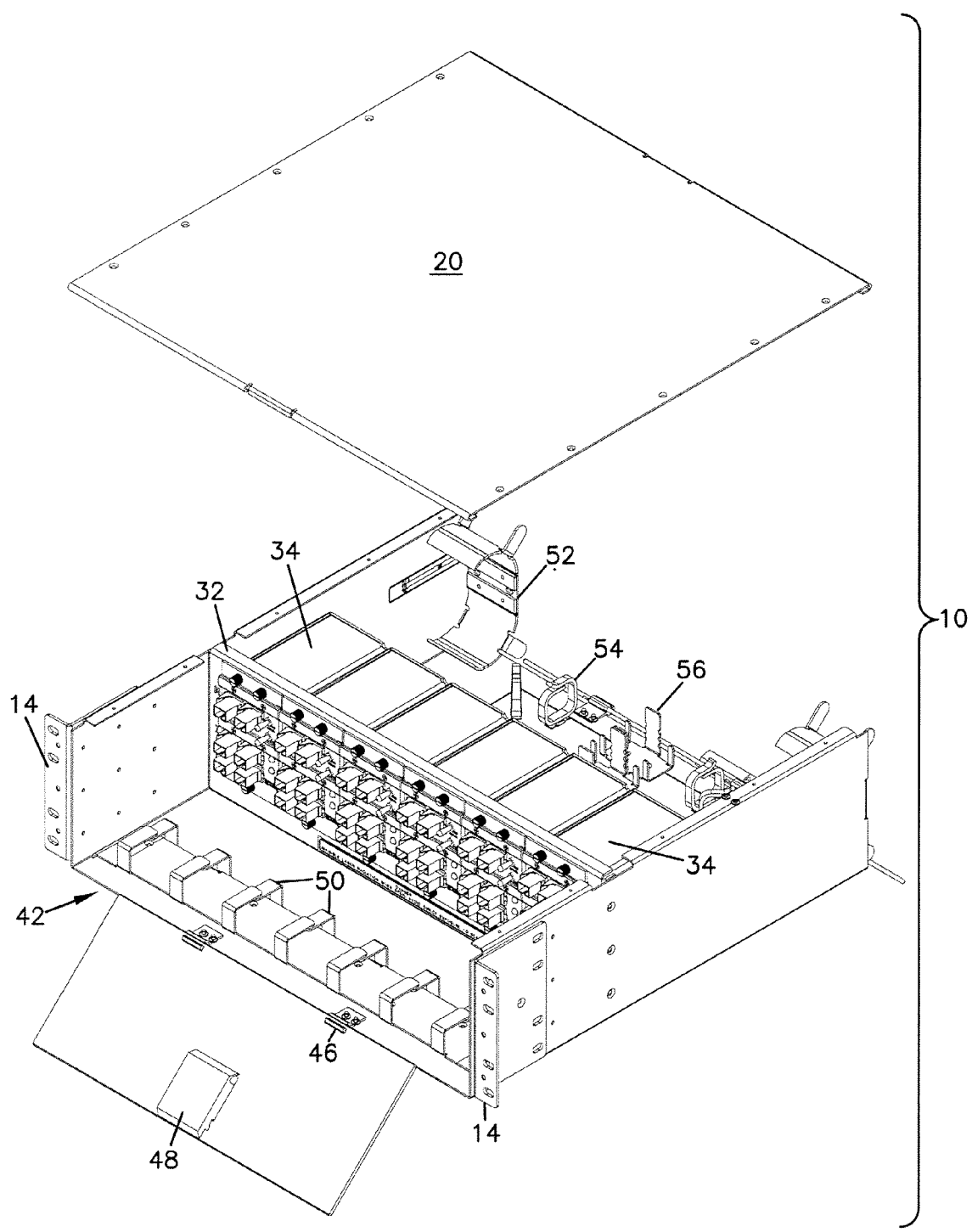
FIG. 8 is an exploded front perspective view of the connection panel of FIG. 1.
Figure 9:
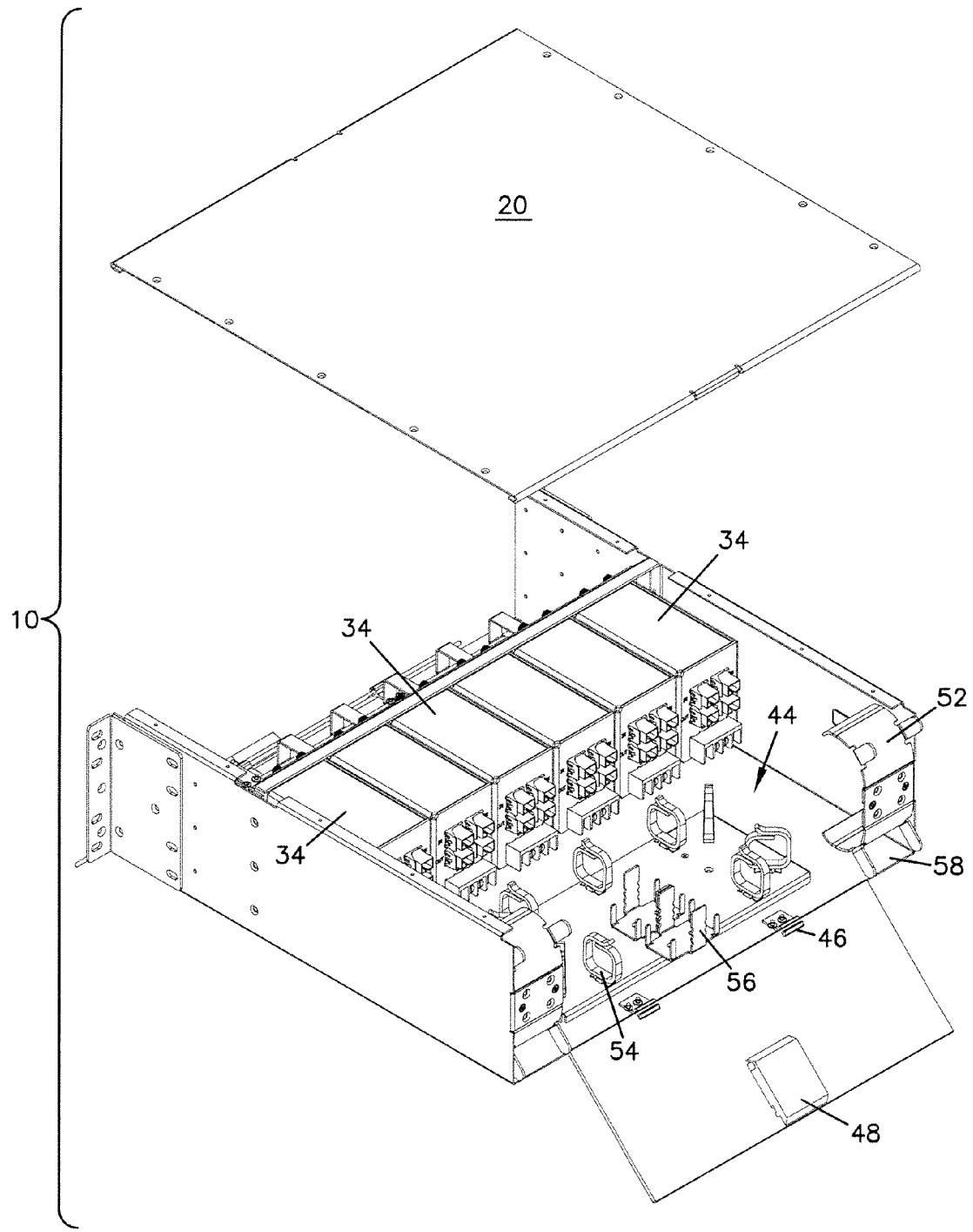
FIG. 9 is an exploded rear perspective view of the connection panel of FIG. 1.
Figure 10:
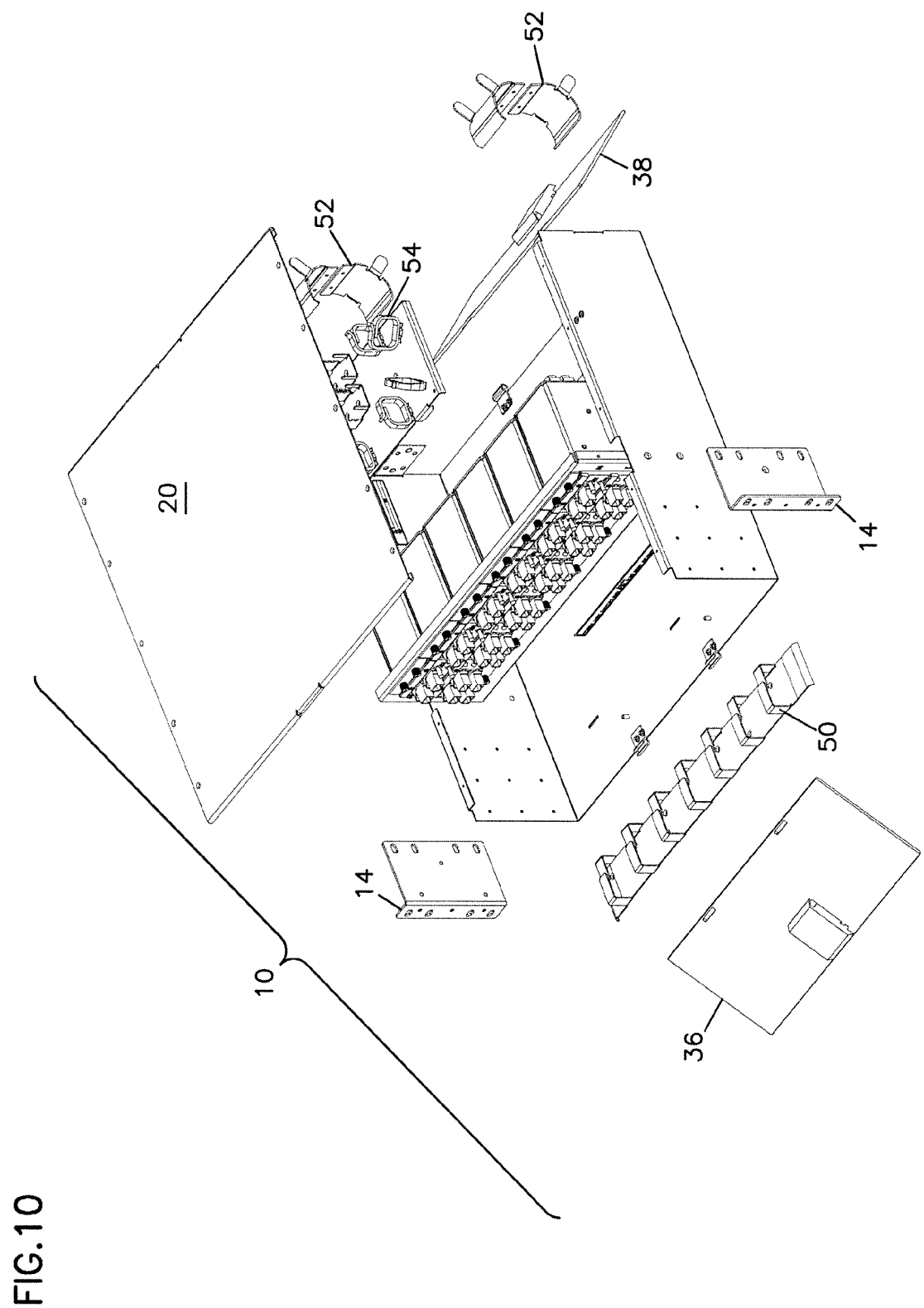
FIG. 10 is a further exploded front perspective view of the connection panel of FIG. 1.
Figure 12:
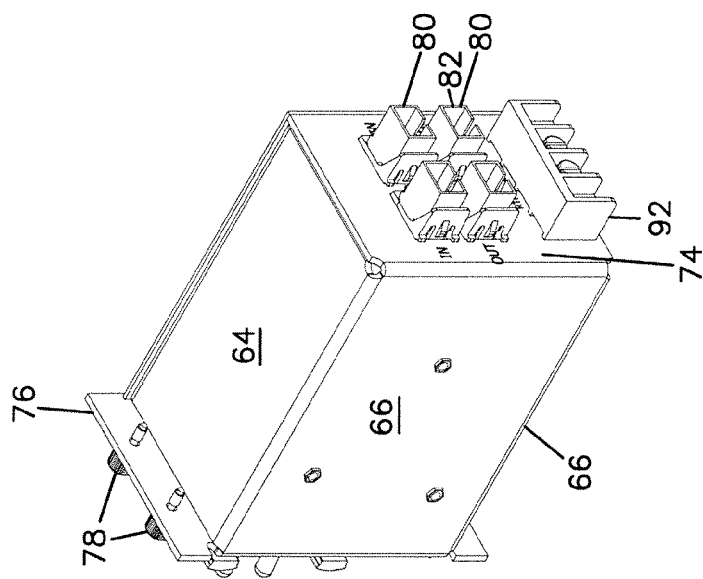
FIG. 12 is a rear perspective view of the circuit module of FIG. 11.
Figure 11:
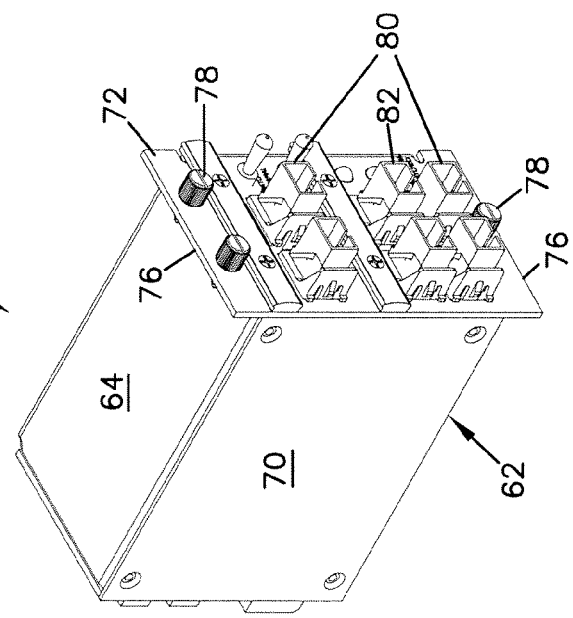
FIG. 11 is a front perspective view of a circuit module from the connection panel of FIG. 1.
Figure 14:
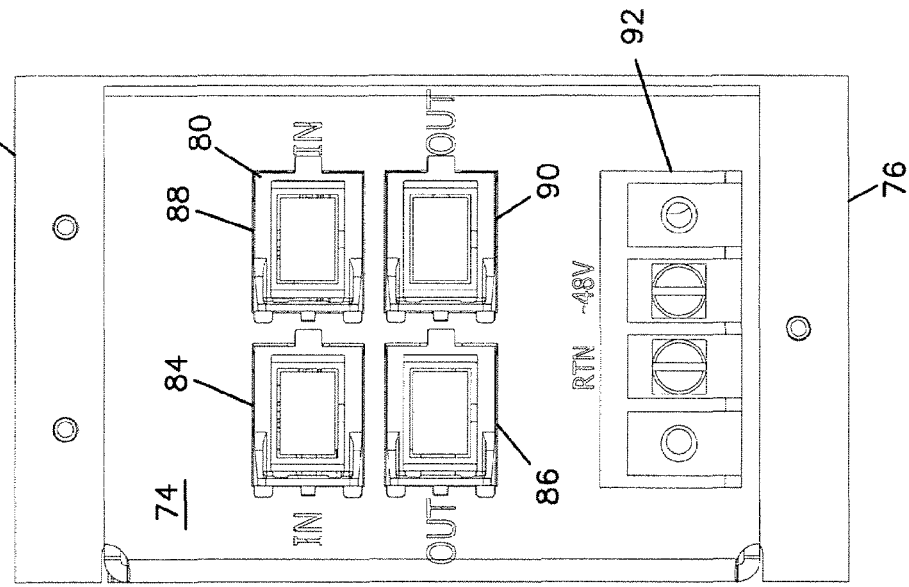
FIG. 14 is a rear elevational view of the circuit module of FIG. 11.
Figure 13:
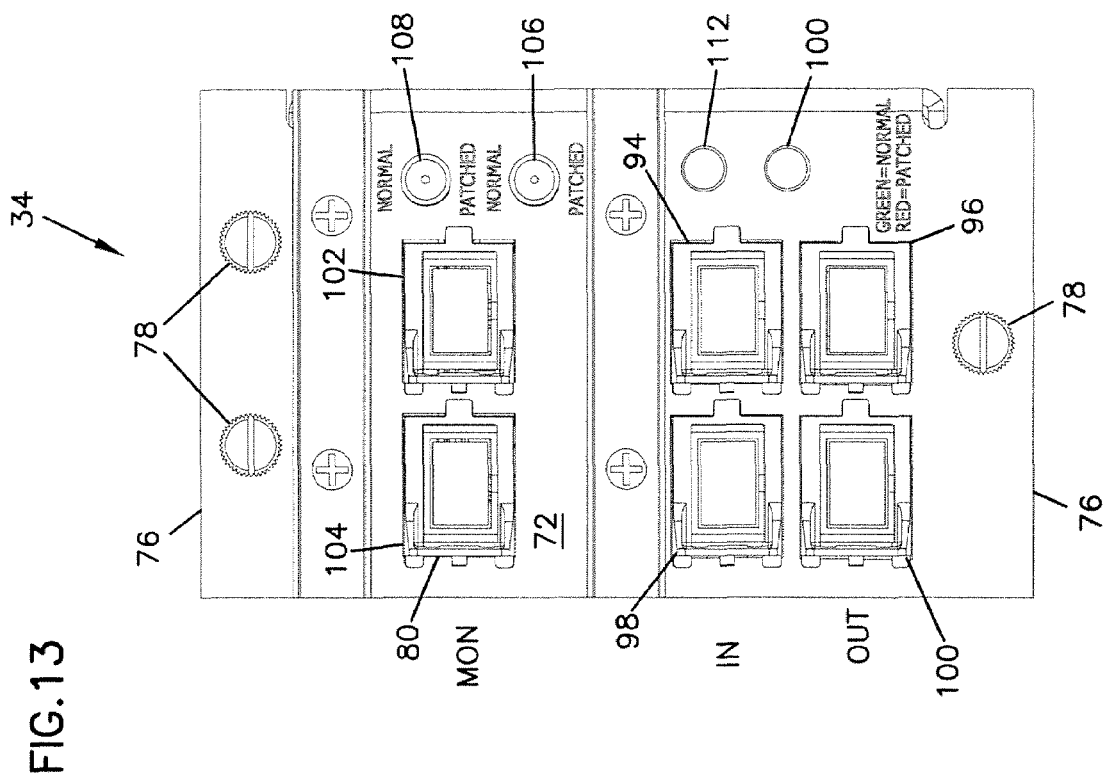
FIG. 13 is a front elevational view of the circuit module of FIG. 11.

Referring now to FIGS. 1-10, a fiber optic communications panel 10 is shown. Panel 10 includes a chassis 12 with brackets 14 for mounting panel 10 to a rack, frame, cabinet, or other structure. Panel 10 includes circuitry that connects fiber optic cables and equipment. The circuitry includes a normal through state, and also a patched state for use in changing the connections between the equipment. The preferred circuitry also includes monitor functions for monitoring signals through panel 10.

Panel 10 includes a front 16, and an opposite rear 18. A top 20, an opposite bottom 22, a left side 24, and a right side 26 cooperate with front and back 16, 18 to define an interior 28 for holding the circuitry. Disposed within interior 28 is a bulkhead 32 that holds a plurality of circuit modules 34 containing the circuitry.

Panel 10 includes a pivoting front cover 36, and a pivoting rear cover 38 for allowing selective access to interior 28 through front 16 or back 18, respectively. Front and rear covers 36, 38 include hinges 46, and latches 48 for selectively latching covers 36, 38 in the closed positions.

Panel 10 includes a front cable management arrangement 42 disposed between bulkhead 32 and front 16. Behind bulkhead 32, and modules 34, panel 10 includes a rear cable management arrangement 44. Both front and rear cable management arrangements 42, 44 are configured for managing cables extending to and from modules 34. Front cable management arrangement 42 includes a plurality of front cable rings 50. Cables extending to the fronts of modules 34 are managed by rings 50 and exit chassis 12 at openings 60 defined by the ends of front cover 36.

Rear cable management arrangement 44 includes a plurality of rear cable rings 54. Cable rings 54 are used for slack storage of cables extending into chassis 12 toward modules 34.

Figure 21:
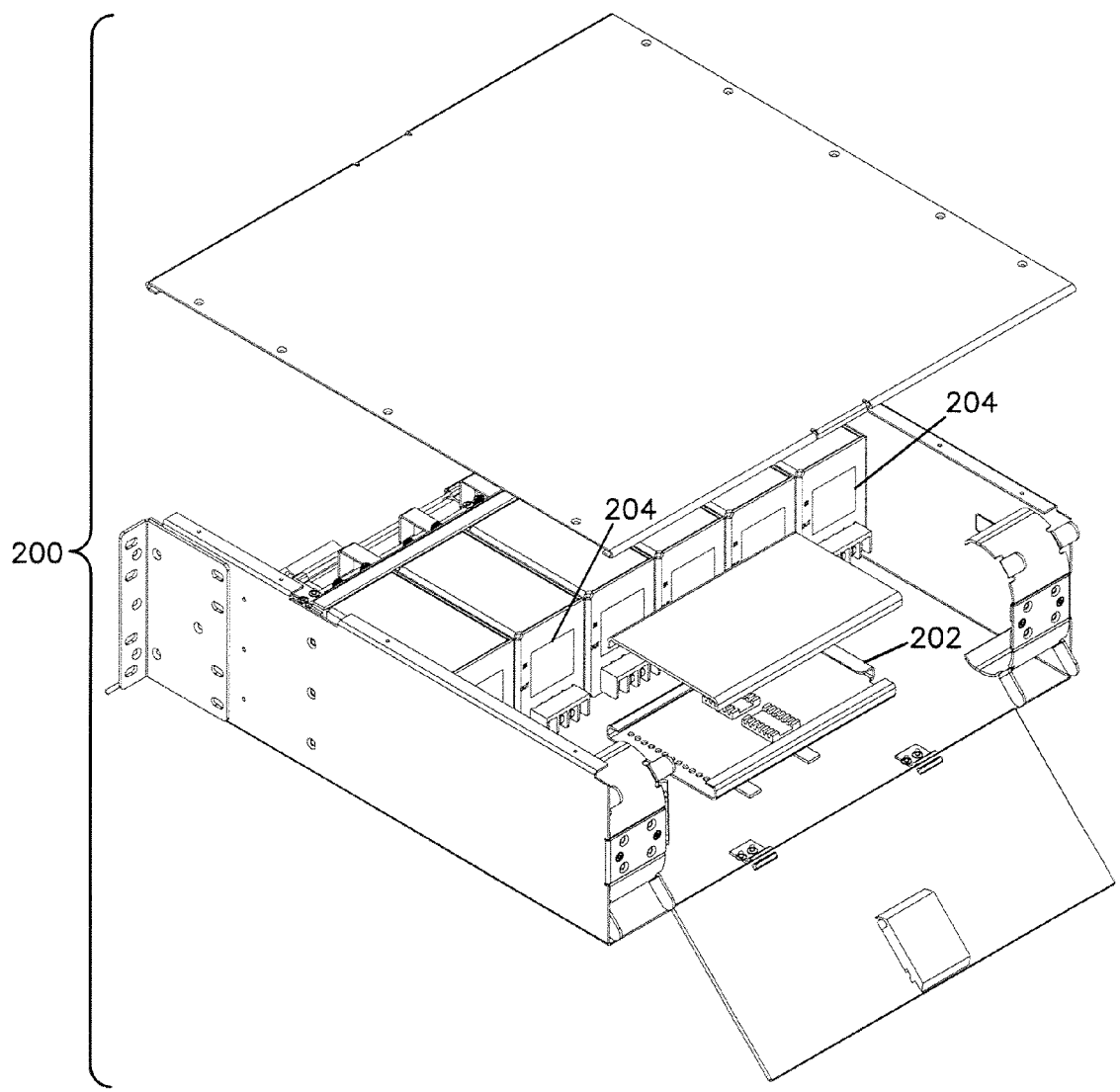
FIG. 21 is an exploded perspective view of an alternative embodiment of a connection panel including splices.

Rear vertical radius limiters 52 define rear openings 58 for cables entering and exiting panel 10. Fan out mounts 56 are also provided in rear cable management arrangement 44 for use in fanning out ribbon cables. Alternatively, rear cable management arrangement 44 includes splice trays for holding cable splices. FIG. 21 shows an alternative panel 200 including a splice tray 202.

Referring now to FIGS. 10-15, one of modules 34 is shown including a module housing 62 including a first side 64, a second side 66, a third side 68, and a fourth side 70. A front face 72, and an opposite rear face 74 cooperate with sides 64, 66, 68, 70 to define an interior 75 for holding circuit elements. Front face 72 includes opposed flanges 76 for mounting to bulkhead 32 with fasteners 78.

Rear face 74 of module 34 includes a plurality of termination locations or ports 80 for accessing the fiber optic circuitry contained within module housing 62. Preferably each termination location 80 includes a fiber optic adapter 82. The illustrated adapters 82 are SC type adapters. Each termination location in panel 10 defines a port for connecting to a fiber optic cable. A first port 84 defines a first IN port or input port. A second port 86 defines an OUT port or output port. Rear face 74 further includes a second IN port 88 and a second OUT port 90. Rear face 74 also includes a power connector 92. In normal operation, in the normal through state, port 84 is connected to port 86 and port 88 is connected to port 90.

Front face 72 of module housing 62 includes a first IN port 94, and a first OUT port 96. Front face 72 further includes a second IN port 98, and a second OUT port 100. In the normal through operation, front ports 94, 96, 98, 100 are not connected to rear ports 84, 86, 88, 90. In the patched operation, front port 94 is connected to rear port 86. Further, front port 96 is connected to rear port 84, front port 98 is connected to rear port 90, and front port 100 is connected to rear port 88. Front face 72 further includes two monitor ports 102, 104 for connecting to rear ports 86, 90, respectively.

Switches 106, 108 on front face 72 control switching between the normal through and the patched configurations. First and second visual indicators 110, 112 indicate which state the switch is in. Switches 106, 108 are manually operated toggle switches. Other manually operated switches could be used, such as push buttons. Visual indicators 110, 112 are electrically powered LED's in the illustrated embodiment. The indicators are optional, since the position of the toggle switches 106, 108 can also indicate the state of the switching circuit.

Figure 15:
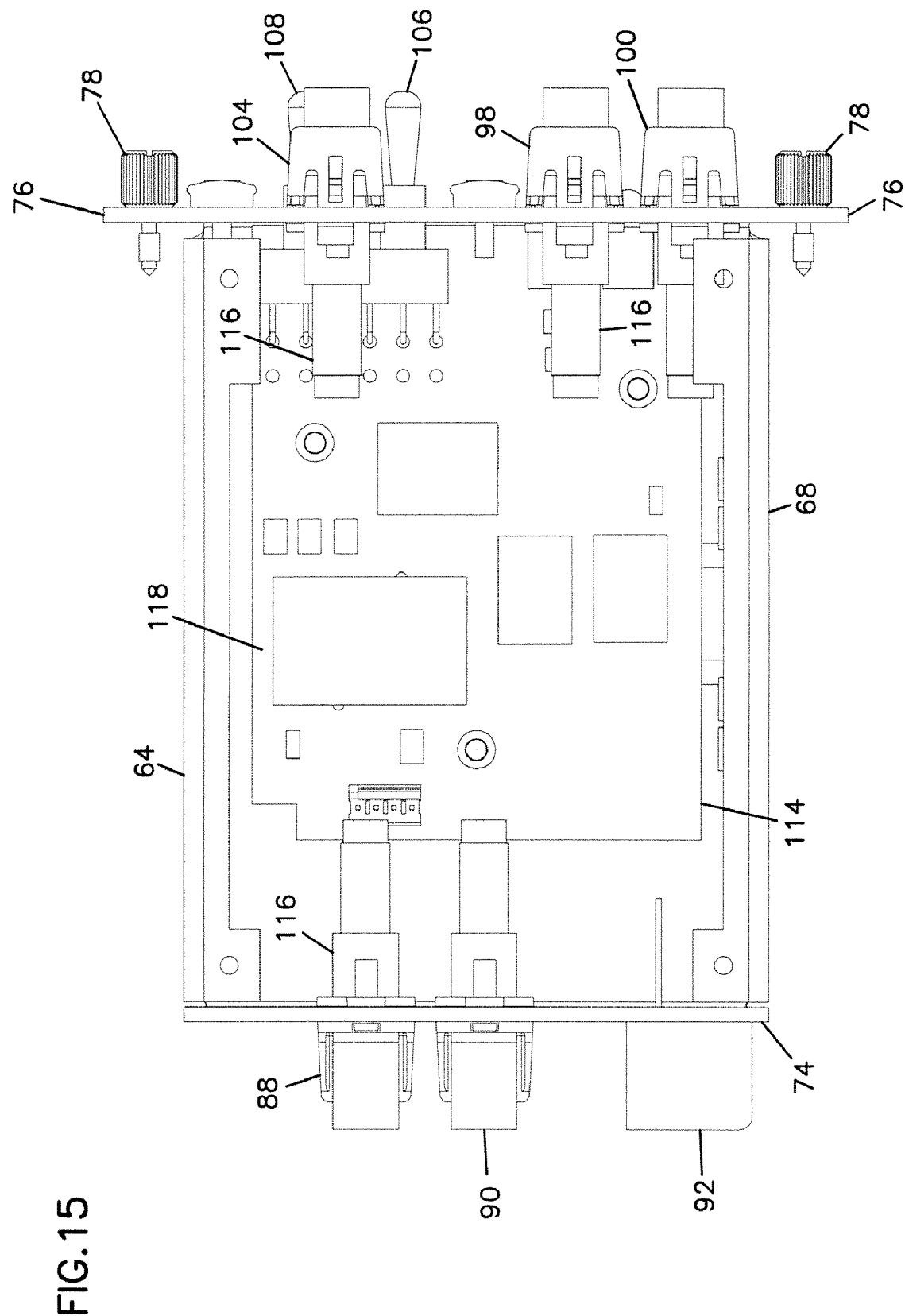
FIG. 15 is a side elevational view of the circuit module of FIG. 11 with one side panel removed.
Figure 16:
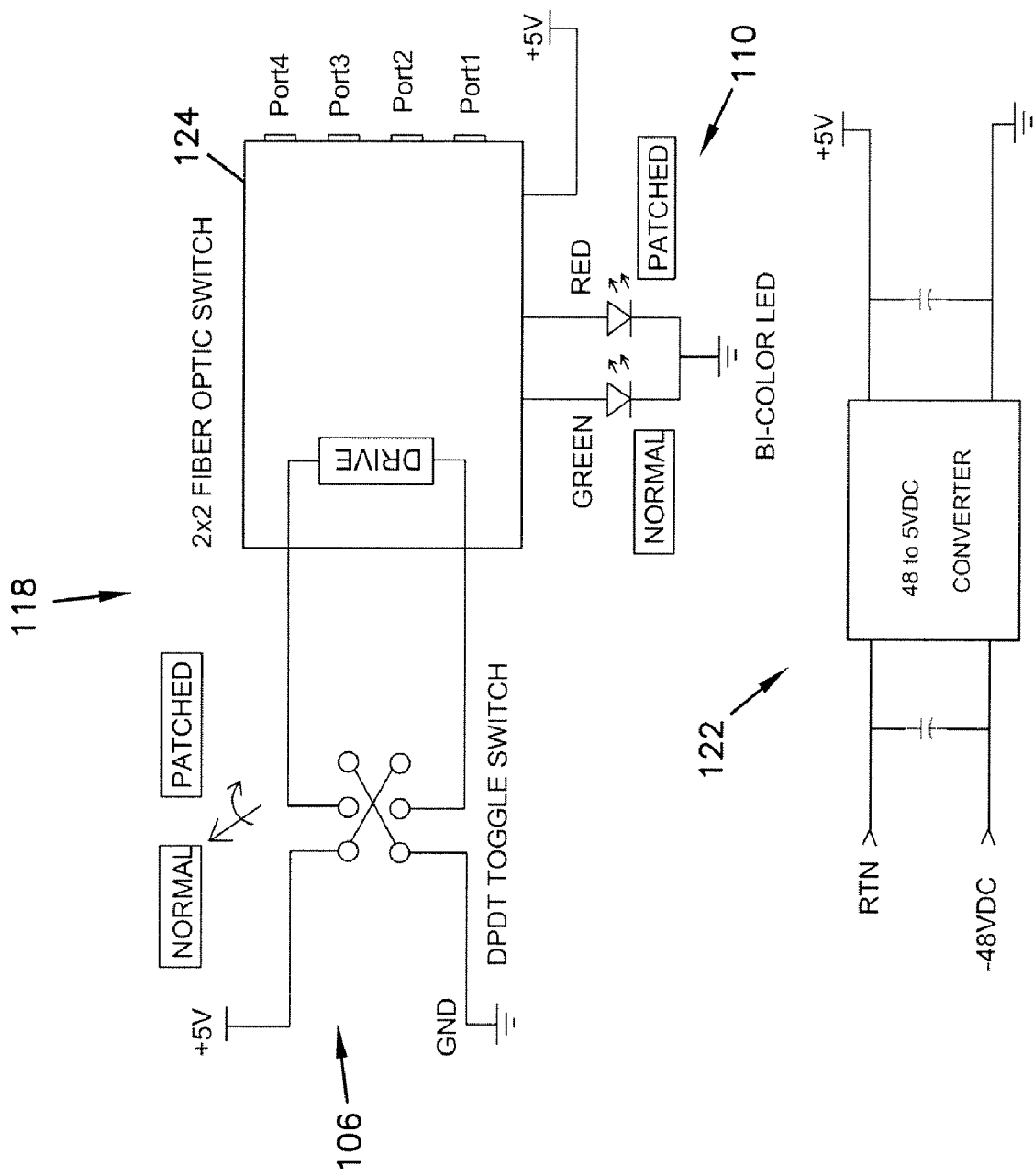
FIG. 16 is a circuit schematic for a portion of the circuitry within the circuit module of FIG. 11.
Figure 17:
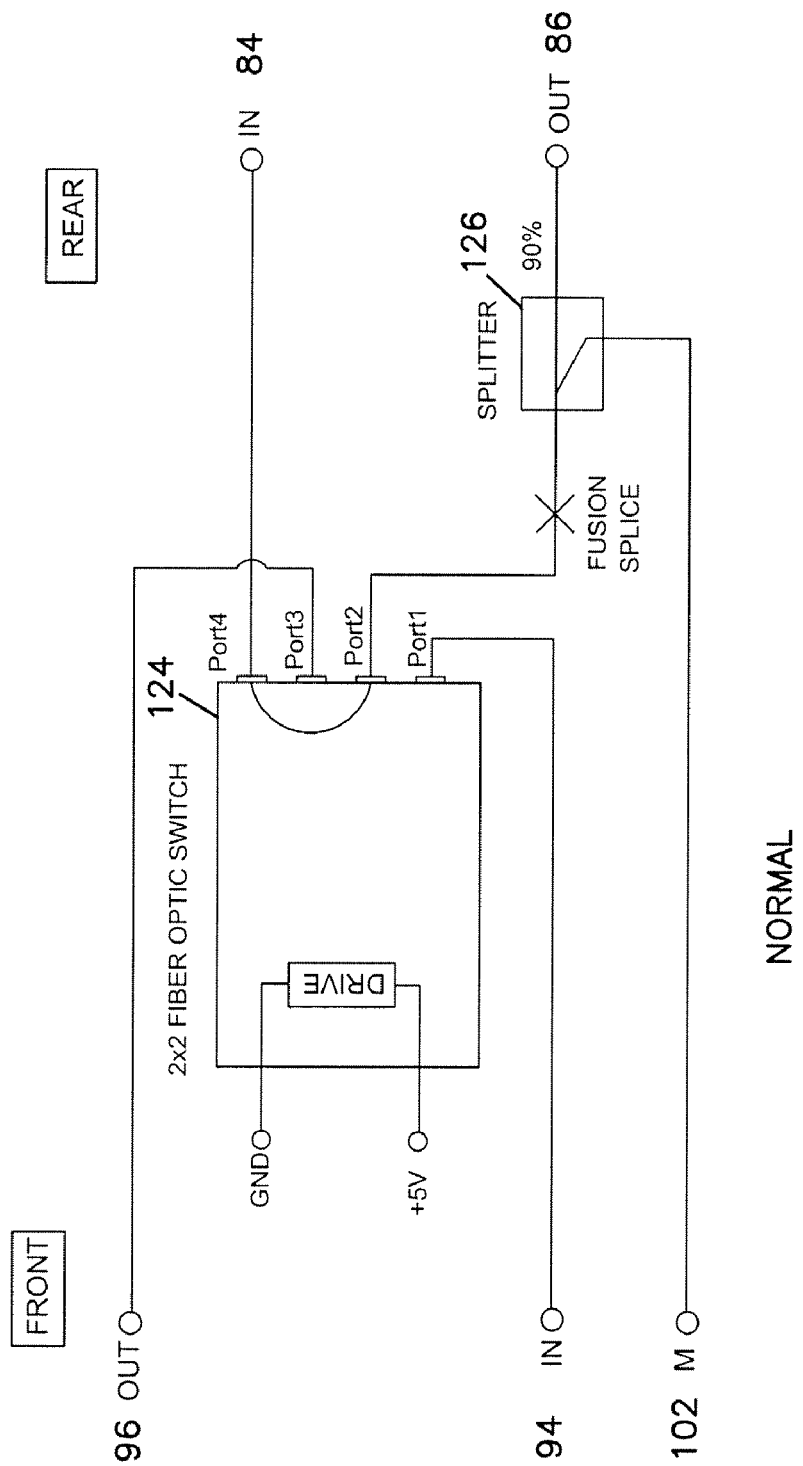
FIG. 17 is a schematic showing the normal through signal pathway through one of the circuits in the circuit module of FIG. 11.
Figure 18:
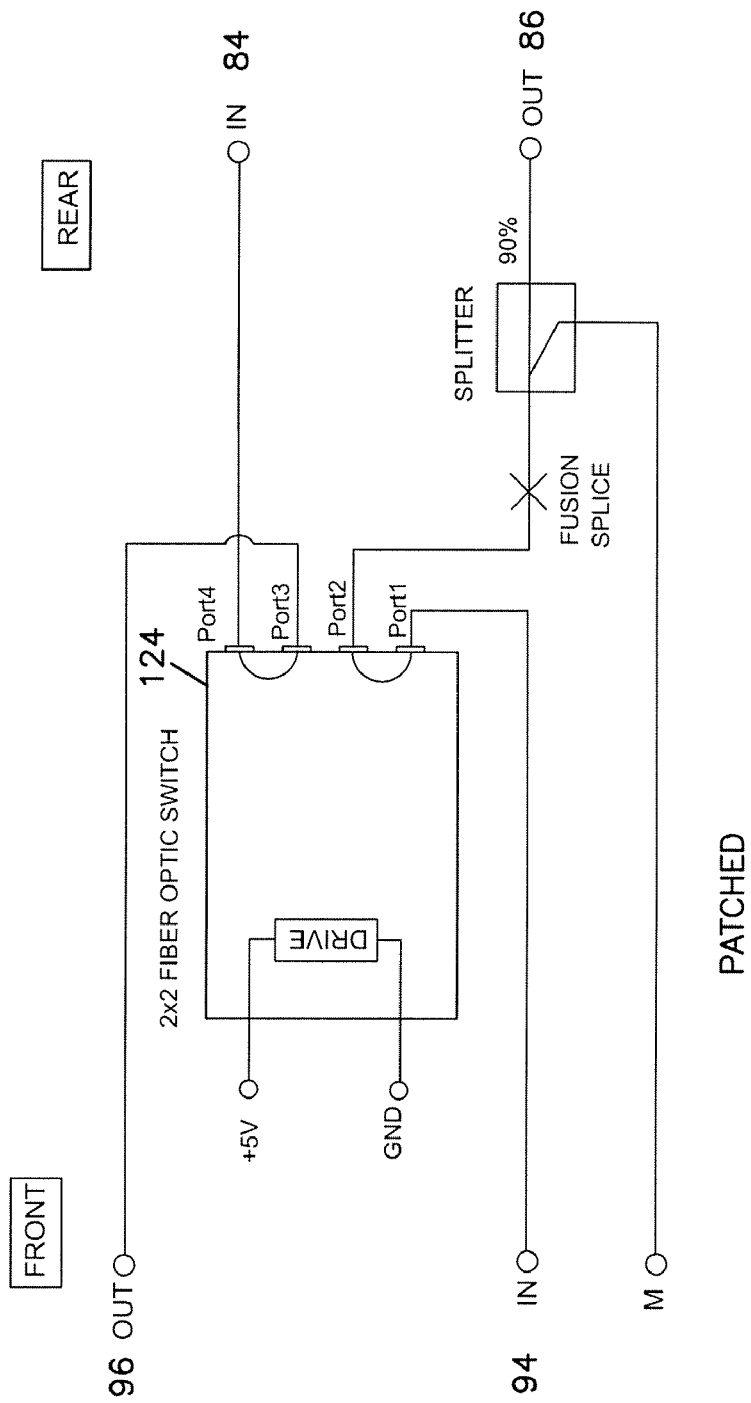
FIG. 18 is a schematic showing the patched signal pathway through one of the circuits in the circuit module of FIG. 11.
Figure 19:
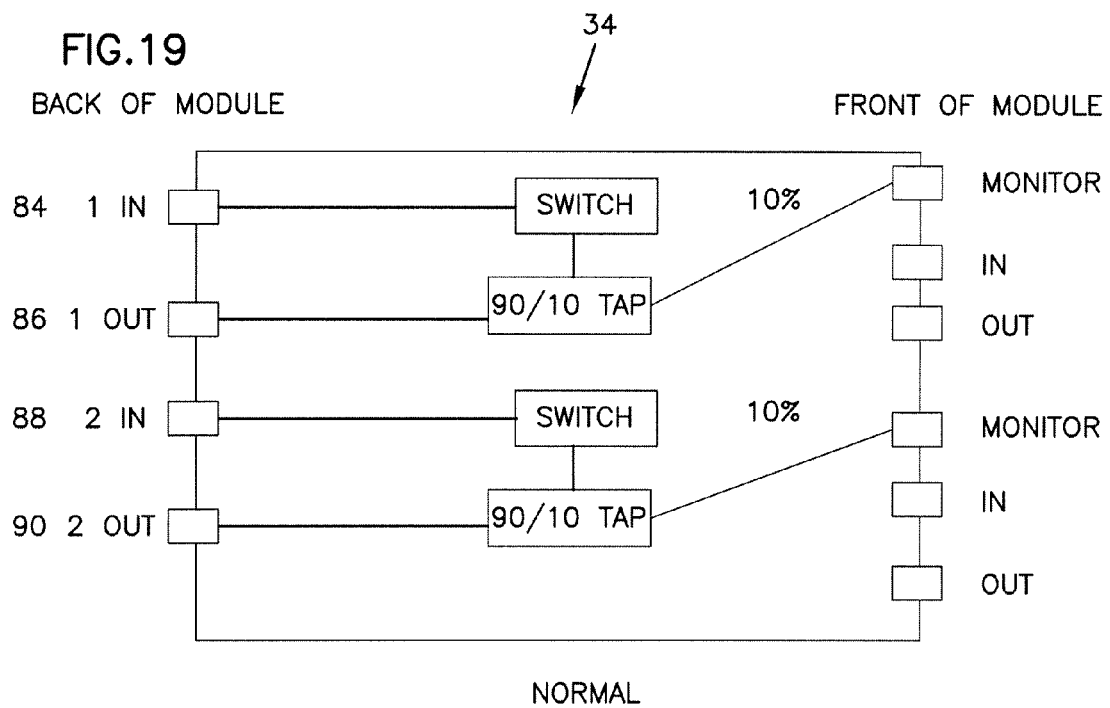
FIG. 19 is another schematic showing the normal through signal pathways through the circuit module.
Figure 20:
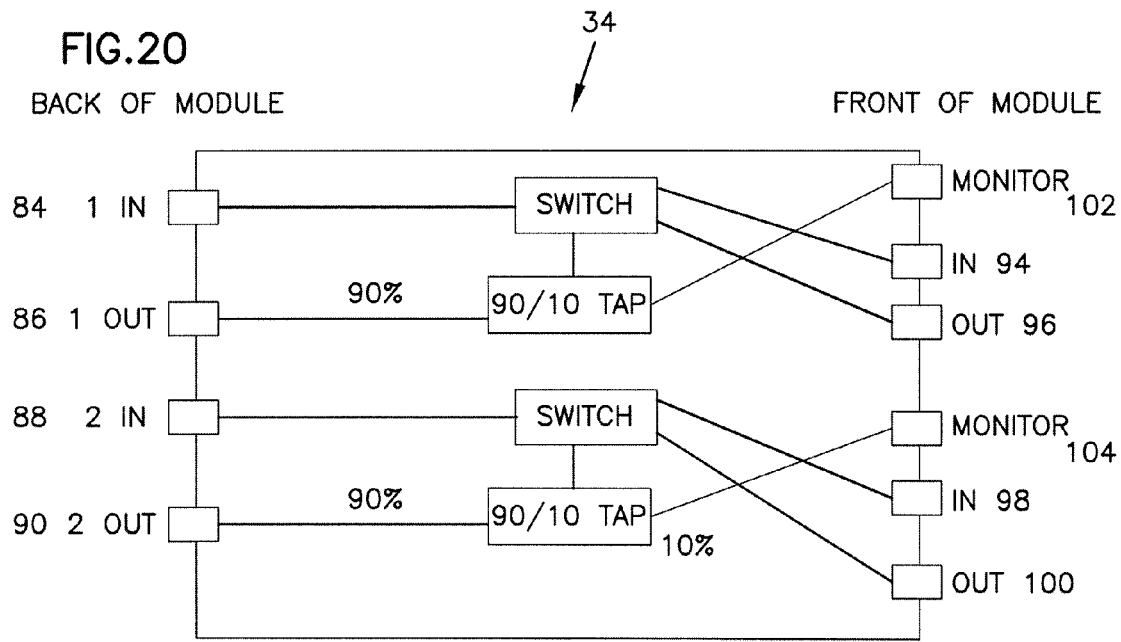
FIG. 20 is a schematic like FIG. 19 showing the patched signal pathways through the circuit module.

Referring now to FIG. 15, interior 75 of module 34 includes a printed circuit board 114 including fiber to PC connectors 116 and circuitry 118. The fiber to PC connectors 116 link ports 82, 84, 86, 88, 90, 94, 96, 98, 100 to PCB 114. Circuitry 118 controls operation of the circuit conditions between the normal through state and the patched state. Circuitry 118 (see FIG. 16) includes a power conversion circuit 122 for converting minus 48 VDC to plus 5 volts for operating a 2×2 optical switch 124. Each toggle switch 106, 108 switches the respective optical switch 124 between states. LED's 110, 112 indicate to the operator the state of the 2×2 switch 124. The monitor function is carried out by a splitter 126, such as a 90/10 splitter.

With circuitry 118, each module 34 can provide a transmit signal pathway and a receive signal pathway. Two modules 34 can be cross-connected together to cross-connect two pieces of equipment.

Module 34 includes two circuits, each with two input ports and two output ports in the normal through state and in the patched state. Module 34 can also be packaged each with a single circuit, if desired. By packaging two circuits in one module, a single 2×2 optical switch can be used to control the circuit states. In single circuit modules, a 1×2 switch would be needed for each module. With the dual circuit module, fewer switches are needed for the overall system.

While the illustrated embodiment of FIGS. 1-20 uses adapters 82 on rear face 74 of module 34, module 34 can be provided with pigtails which extend out from the interior of the module through an opening 204 in the module and connect to fiber optic cables, such as through a splice in a splice tray of the panel 200 (see FIG. 21). Splice trays 202 can be used in rear cable management arrangement 44, instead of the noted cable clips and fan out mounts as shown in FIG. 21.

Figure 22:
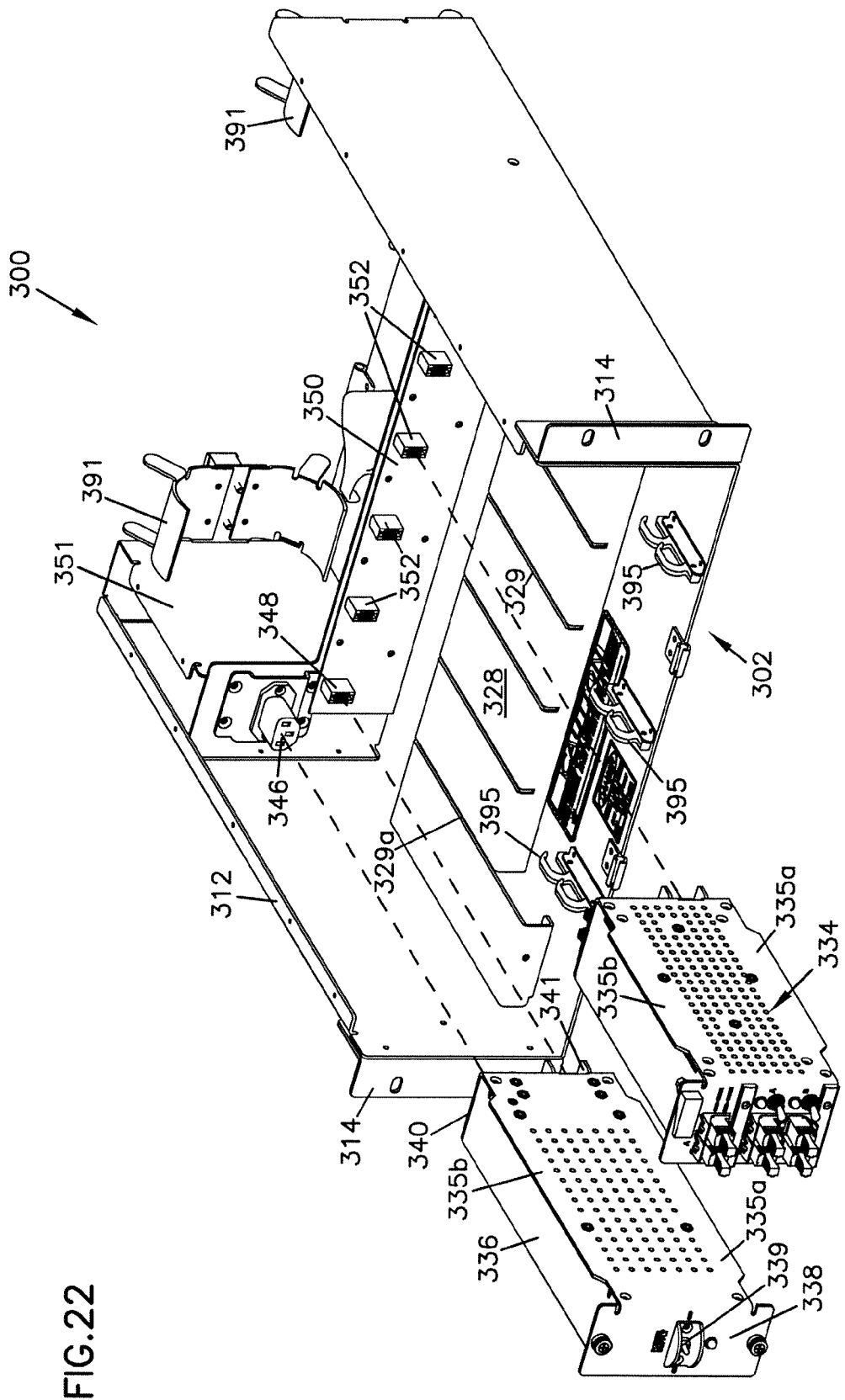
FIG. 22 is a front perspective view of another embodiment of a fiber optic connection panel with the front cover removed and a power supply module and circuit module shown in exploded form in accordance with the present invention.

Referring now to FIG. 22, another fiber optic communications panel 300 is shown. Panel 300 includes many components that are similar to those described above for panel 10. For example, panel 300 includes a chassis 312 with brackets 314 for mounting panel 300 to a rack, frame, cabinet, or other structure.

Panel 300 also includes an interior 328 for holding a plurality of circuit modules 334 (a single module 334 is shown in FIG. 22) containing circuitry, and a power supply module 336. Interior 328 includes rail guides 329 sized to accept fins 335a of modules 334, 336 to guide modules 334, 336 into chassis 312. Modules 334, 336 also include similar fins 335b extending in an opposite direction to engage opposing rail guides (not shown) in interior 328.

Interior 328 also includes a plurality of cable management structures including fingers 395 radius limiters 391. Interior 328 also includes a power bus 350 and an electrical isolation wall 351. Electrical isolation wall 351 and chassis 312 define therebetween a space through which electrical wires can be run to carry power from a rear of chassis 312 to connector 346, described further below. Electrical isolation wall 351 functions to isolate the electrical wires running therethrough from the remaining components in interior 328.

Figure 23:
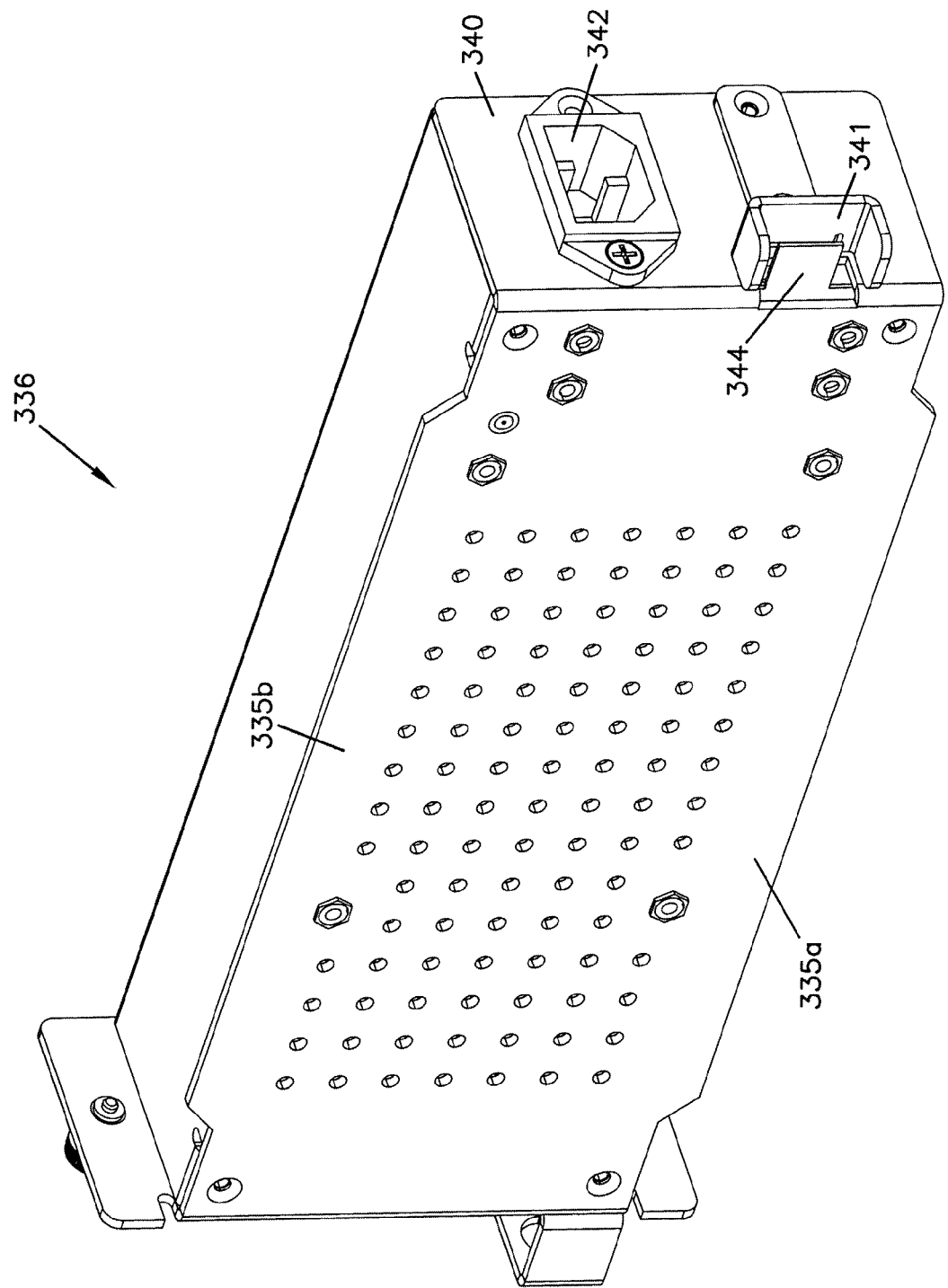
FIG. 23 is a rear perspective view of the power supply module of FIG. 22.
Figure 25:
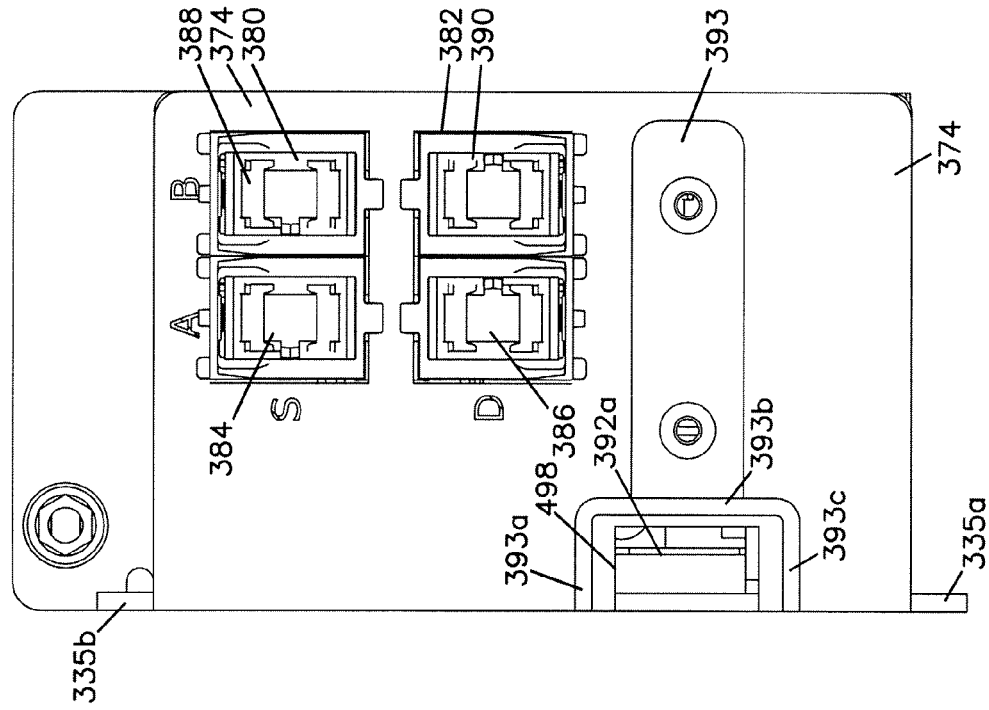
FIG. 25 is a rear elevational view of the circuit module of FIG. 22.
Figure 24:
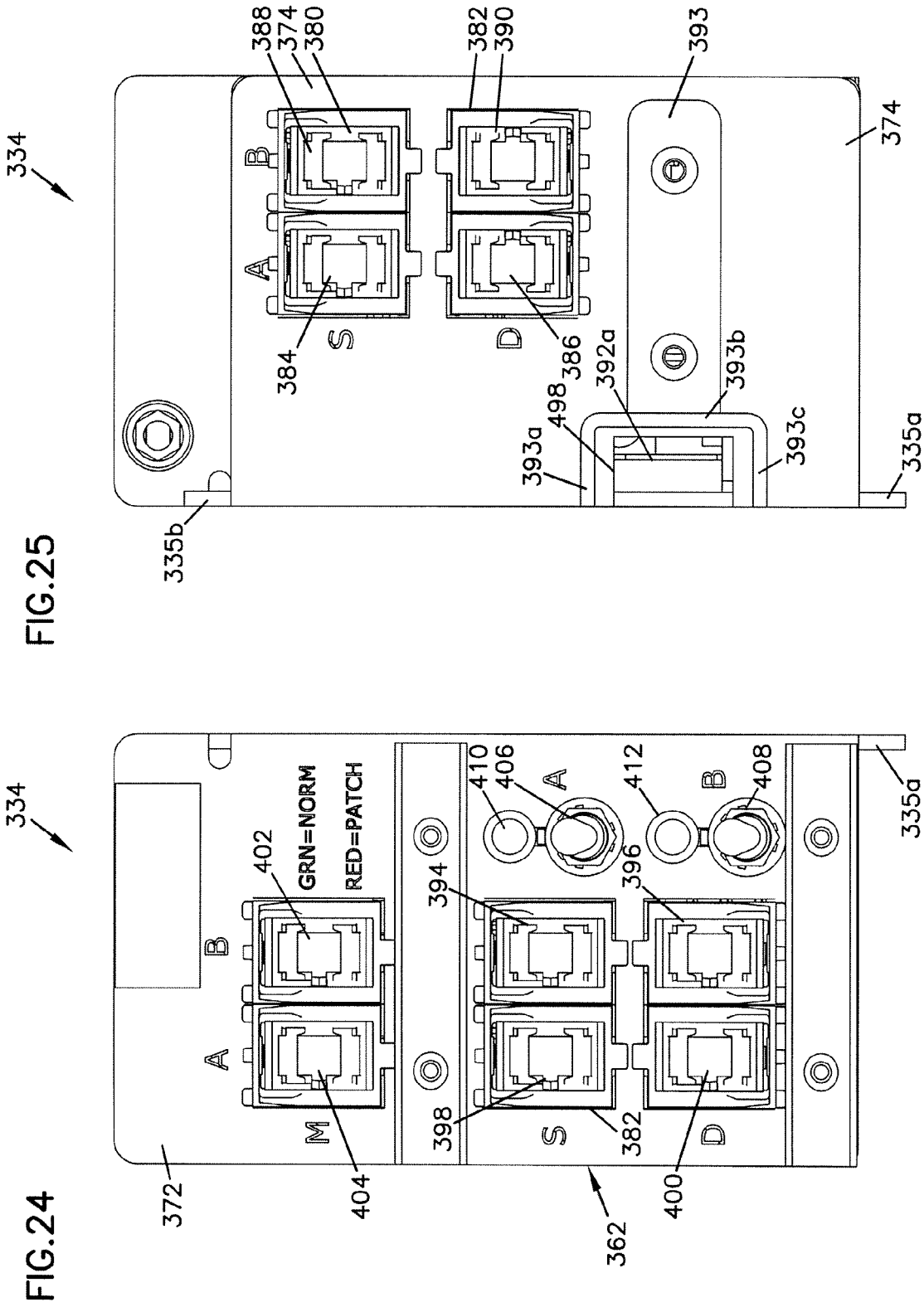
FIG. 24 is a front elevational view of the circuit module of FIG. 22.
Figure 26:
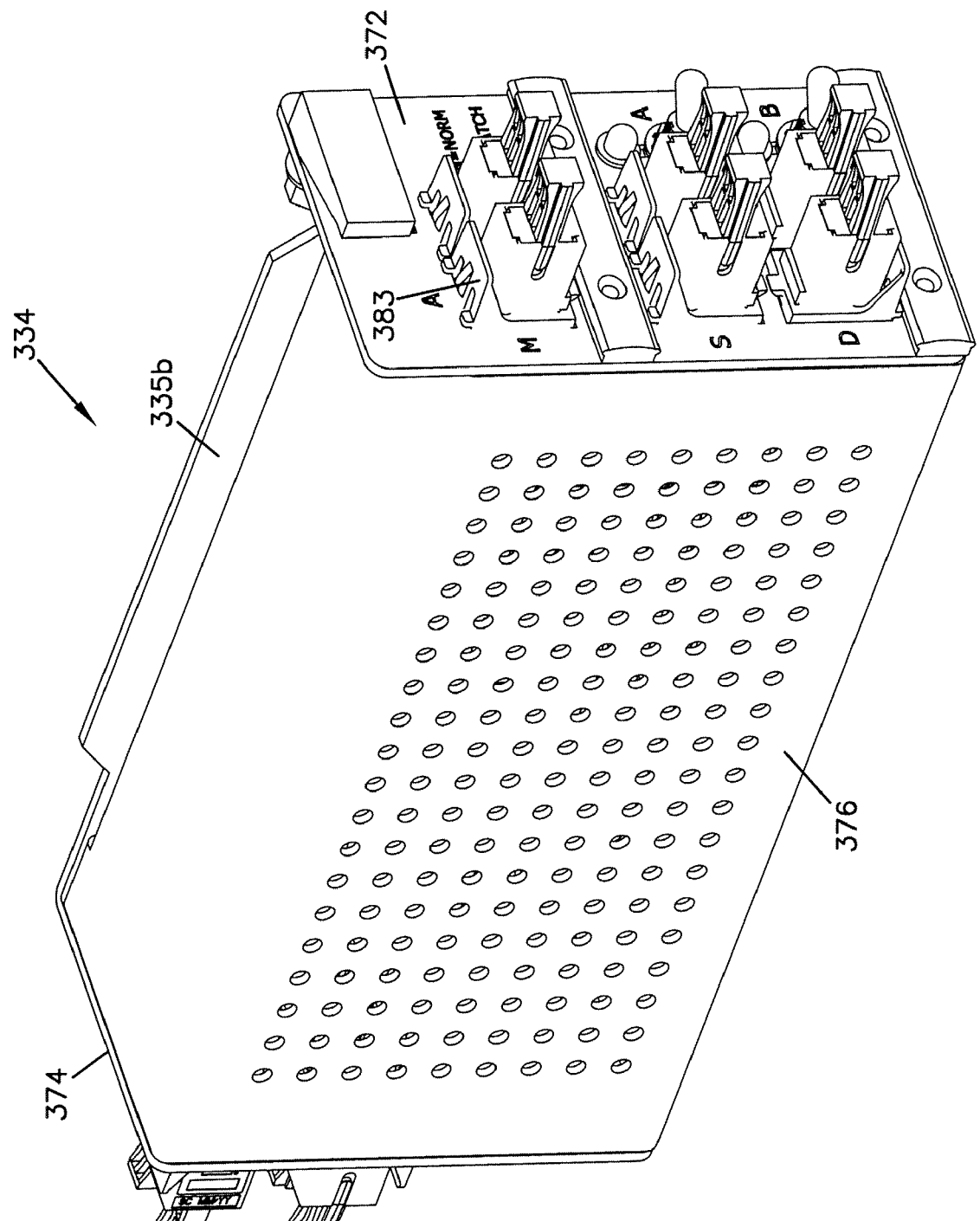
FIG. 26 is a front perspective view of the circuit module of FIG. 22.
Figure 27:
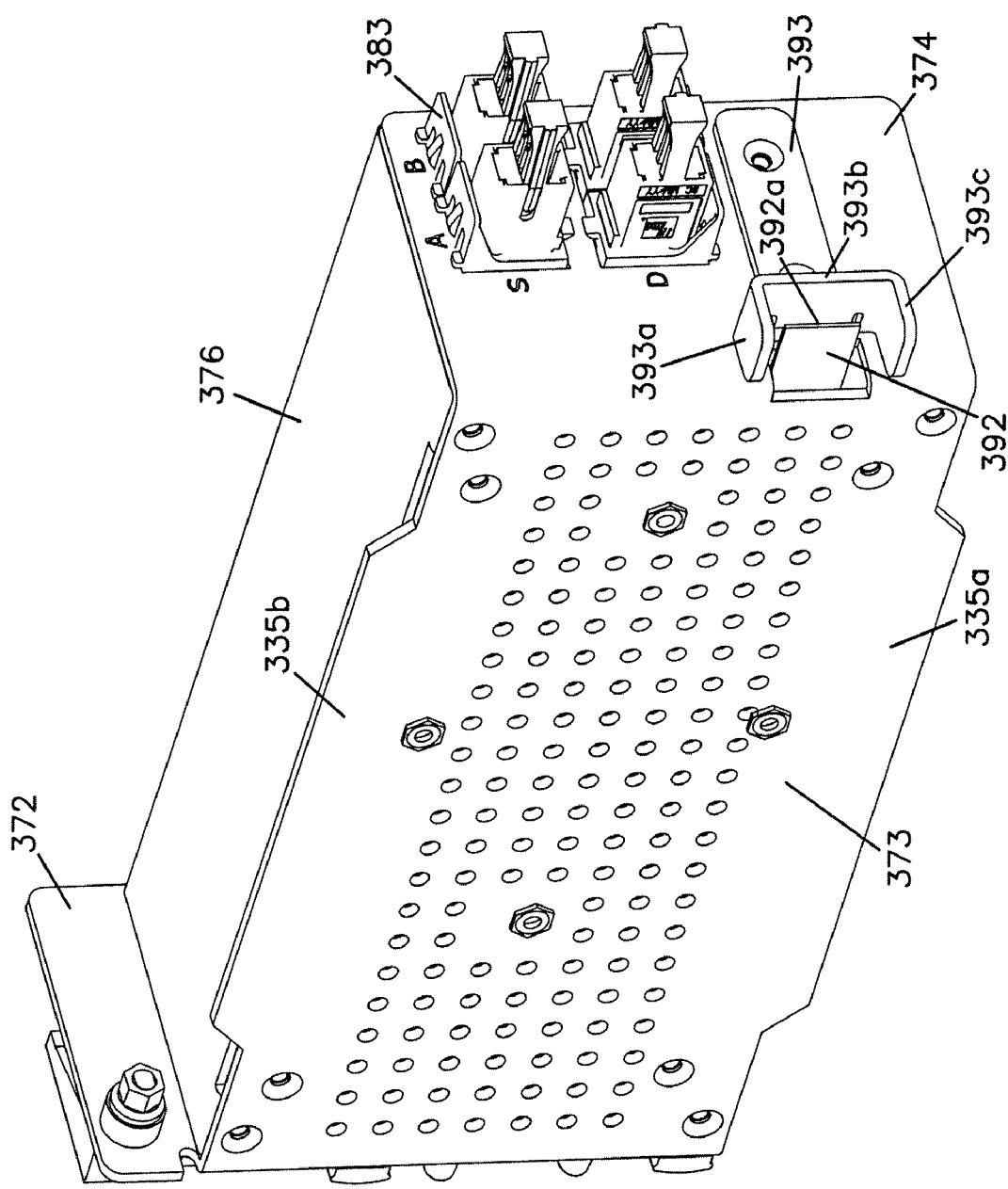
FIG. 27 is a back perspective view of the circuit module of FIG. 22.

Referring to FIGS. 22 and 23, power supply module 336 includes a front face 338 with a switch 339 that is used to turn the power supply module 336 on and off. A rear face 340 of the power supply module 336 includes a power connector 342 and a PCB connector 344. When power supply module 336 is inserted into interior 328 of panel 300, fin 335a is guided by rail guide 329a toward a rear of panel 300 until power connector 342 of power supply module 336 is connected to connector 346 mounted to chassis 312. Connector 346 is, in turn, connected to a source of power such as, for example, an alternating current (AC) power source.

In addition, PCB connector 344 of power supply module 336 connects to connector 348 of bus 350 mounted in interior 328 of panel 300. Bus 350 also includes a plurality of connectors 352 positioned along the bus 350 to provide power to modules 334, as described below. In this configuration, power is provided from an AC source through connector 346 to power supply module 336, and power supply module 336 provides power (e.g., 48 VDC) to connectors 352 of bus 350 through PCB connector 344 and connector 348.

In the illustrated embodiment, power supply module 340 is accessible from a front 302 of panel 300. In this configuration, power supply module 340 can be inserted into and removed from interior 328 of panel 300 from the front 302 of panel 300. In one embodiment, power supply module 340 is "hot swappable," meaning that power supply module 340 can be removed and/or inserted into panel 300 without turning off the AC power source to panel 300.

Referring now to FIGS. 24-30, example module 334 is shown including a module housing 362 with a front face 372 and an opposite rear face 374. Module housing 362 also includes a sidewall 373 and a cover 376. Front and rear faces 372, 374, sidewall 374, and cover 376 together define an interior space interior 375 for circuit elements. More or fewer walls can also be used to form interior 375.

Rear face 374 of module 334 includes a plurality of termination locations or ports 380 for accessing the fiber optic circuitry contained within module housing 362. Each termination location 380 includes a fiber optic adapter 382 coupled to module 334 using a bracket 383. See FIG. 30. Bracket 383 includes a tab 383a that can be accessed (depressed) from an outside of module 334 to allow bracket 383, adapter 382, and an associated fiber optic connector, such as connector 462 (described further below), to be removed from termination location 380. A first port 384 defines a first source "S" port or input port. A second port 386 defines a destination "D" port or output port. Rear face 374 further includes a second source port 388 and a second destination port 390. In normal operation, in the normal through state, port 384 is connected to port 386 and port 388 is connected to port 390. See FIG. 31.

Rear face 374 also includes a PCB connector 392 extending through an aperture 498. When module 334 is inserted into chassis 312, PCB connector 392 connects to a respective one of the connectors 352 of bus 350 and power for module 334 is provided therethrough. In addition, a bracket 393 coupled to rear face 374 includes portions 393a, 393b, and 393c that extend from rear face 374 to protect PCB connector 392. (See also bracket 341 coupled to power supply module 336.) In the example shown, portions 393a, 393b, and 393c surround three sides of PCB connector 392 and extend beyond an end 392a of PCB connector 392 to protect PCB connector 392. Portions 393a, 393b, 393c are also configured so that portions 393a, 393b, 393c do not interfere when PCB connector 392 is connected to connector 352 on bus 350.

Figure 31:
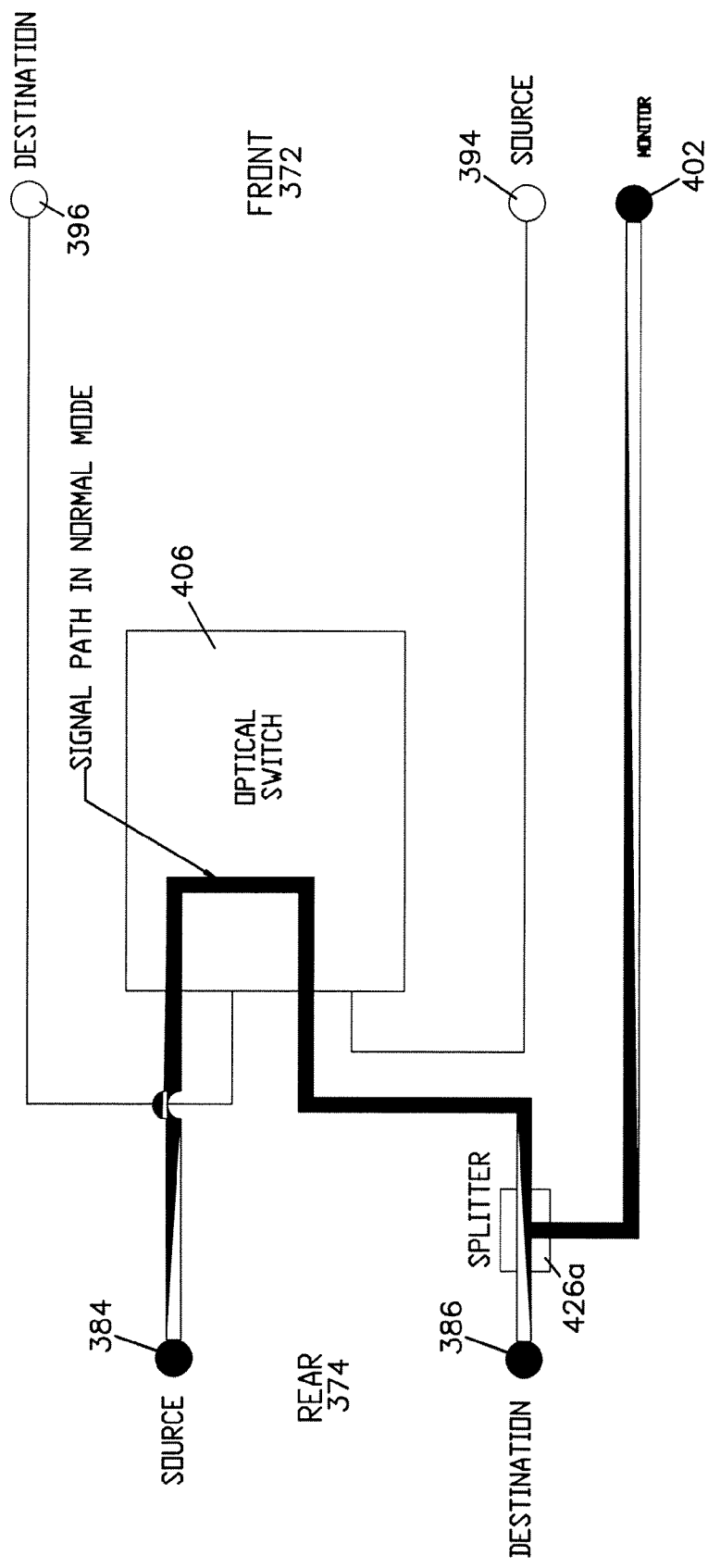
FIG. 31 is a schematic showing the normal through signal pathway through one of the circuits of the circuit module of FIG. 22.
Figure 32:
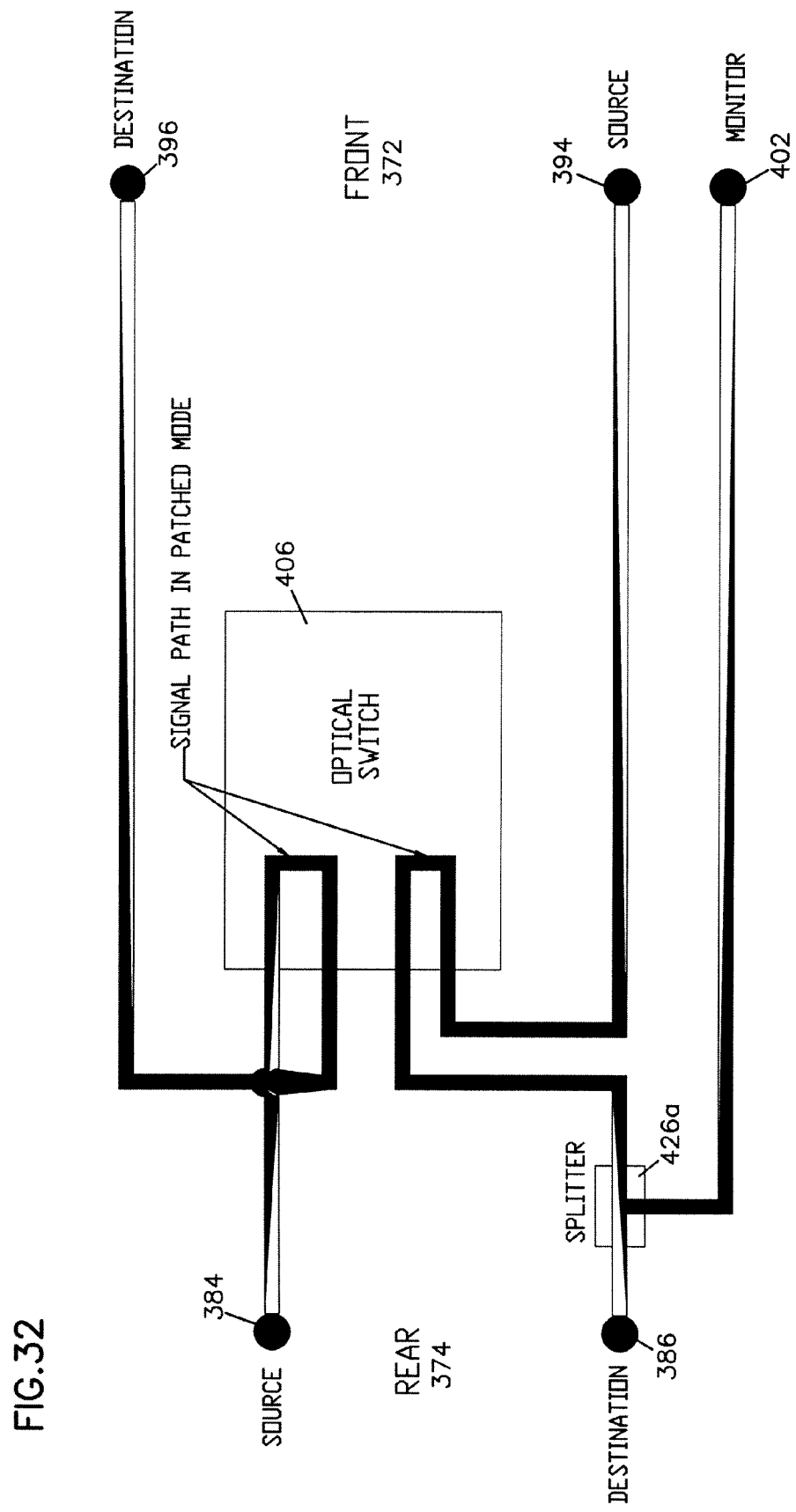
FIG. 32 is a schematic showing the patched signal pathway through one of the circuits of the circuit module of FIG. 22.

Front face 372 of module housing 362 includes a first source "S" port 394, and a first destination "D" port 396. Front face 372 further includes a second source port 398, and a second destination port 400. In the normal through operation, front ports 394, 396, 398, 400 are not connected to rear ports 384, 386, 388, 390. See FIG. 31. In the patched operation, front port 394 is connected to rear port 386. Further, front port 396 is connected to rear port 384, front port 398 is connected to rear port 390, and front port 400 is connected to rear port 388. See FIG. 32. Front face 372 further includes two monitor ports 402, 404 for connecting to rear ports 386, 390, respectively.

Switches 406, 408 on front face 372 control switching between the normal through and the patched configurations. First and second visual indicators 410, 412 indicate which state each switch is in (for example, green for normal through, red for patched). Switches 406, 408 are manually operated toggle switches. In the example shown, switches 406, 408 are momentary toggle switches. Other switches can be used, such as push buttons. Visual indicators 410, 412 are electrically powered LED's in the illustrated embodiment.

Figure 28:
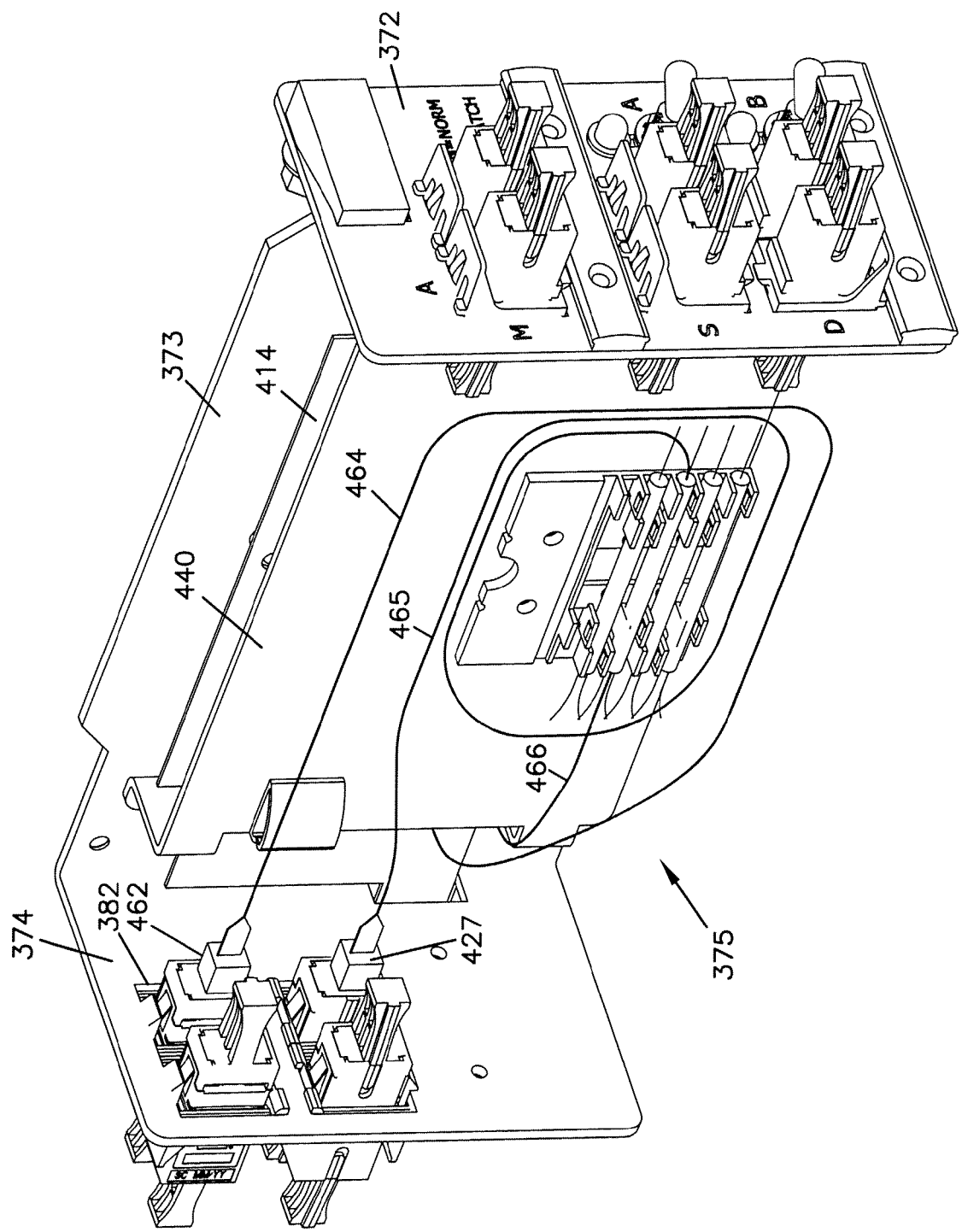
FIG. 28 is a perspective view of the circuit module of FIG. 22 with the cover removed.
Figure 29:
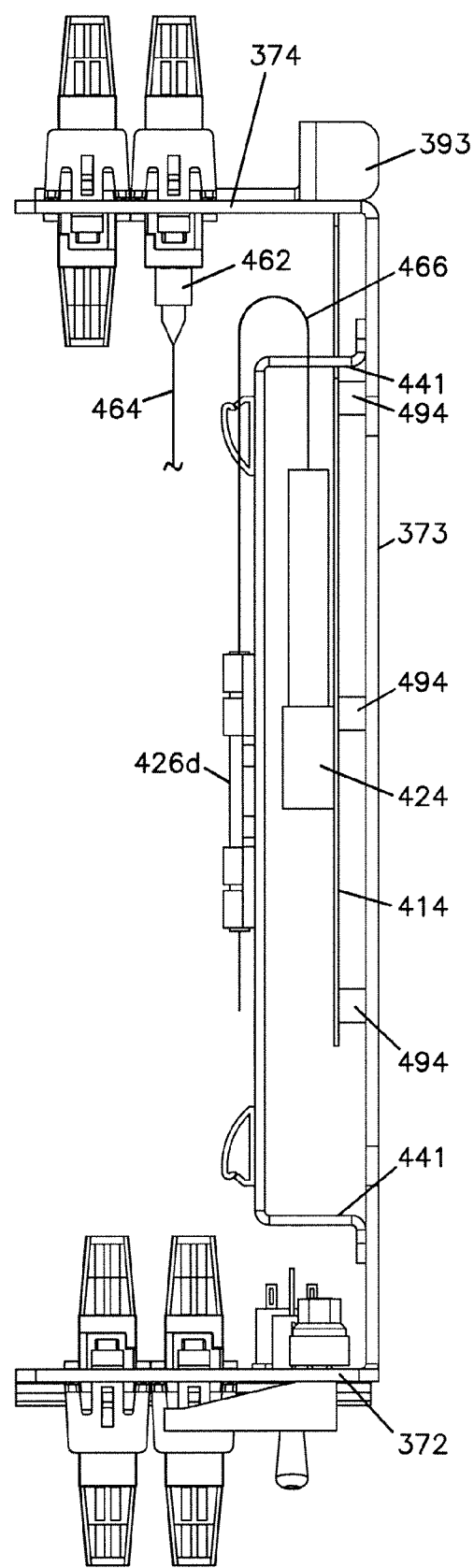
FIG. 29 is a top view of the circuit module of FIG. 28.
Figure 30:
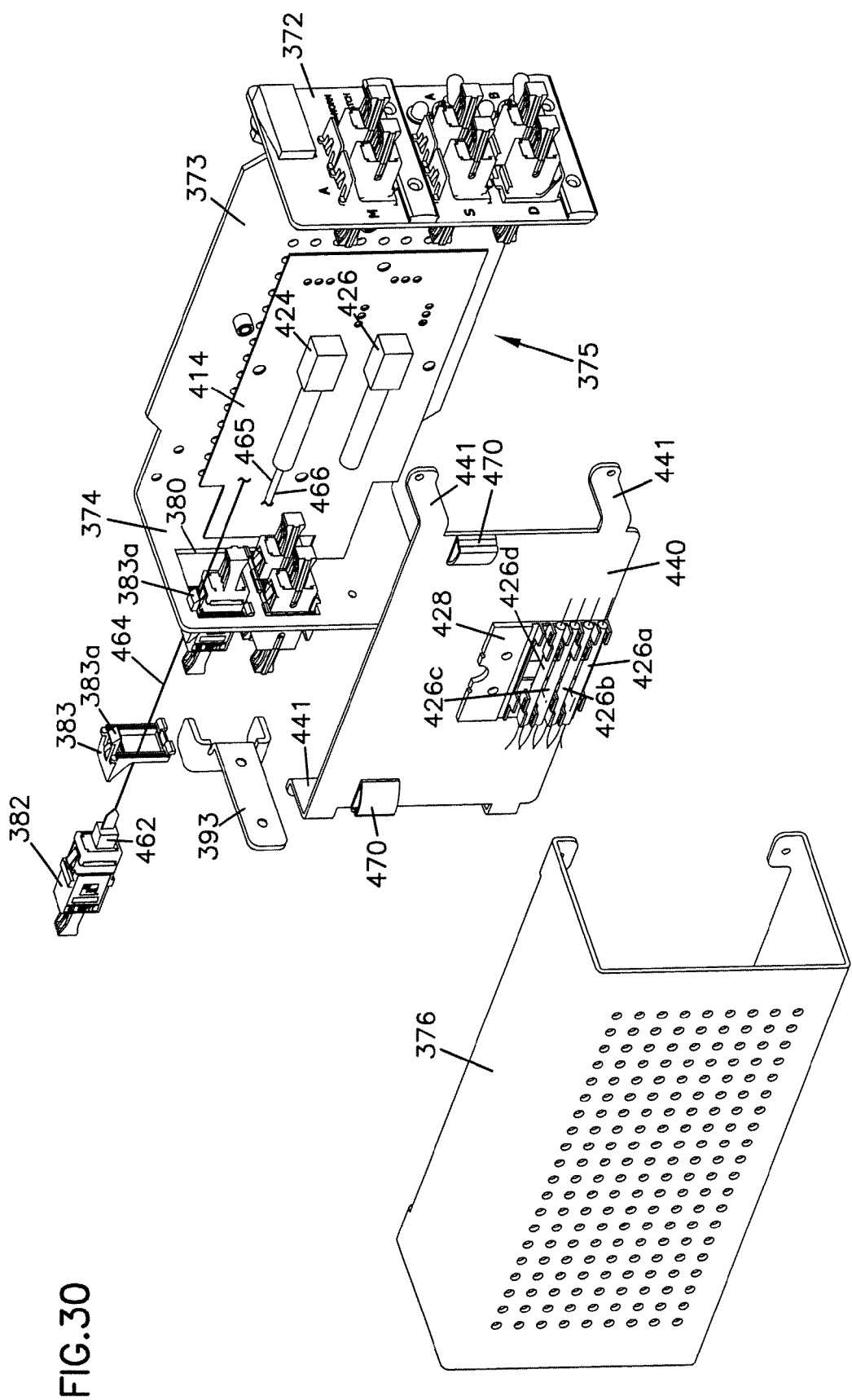
FIG. 30 is an exploded perspective view of the circuit module of FIG. 22.

Referring now to FIGS. 28-30, interior 375 of module 334 includes a PCB 414 coupled to sidewall 373 by screws inserted into mounts 494 of sidewall 373. PCB 414 includes circuitry including optical switches 424, 426. Each switch 406, 408 on front face 372 switches the respective optical switch 424, 426 between states. LED's 410, 412 indicate the state of each switch 424, 426. PCB 414 also includes PCB connector 392 extending through aperture 498 of rear face 374 to provide power to PCB 414 and switches 424, 426. In the example shown, PCB connector 392 is part of PCB 414.

For example, PCB connector 392 includes tracings that extend from PCB 414 to adjacent an end 392a of PCB connector 392 so that, when PCB connector 392 is connected to one of the connectors 352 of bus 350, power is provided to PCB 414.

Also included in interior 375 of module 334 is a separator plate 440 including legs 441 coupled to sidewall 373 by screws. A plurality of splitters 426a, 426b, 426c, 426d is coupled to a bracket 428 on separator plate 440. In the example shown, splitters 426a, 426b, 426c, 426d are 90/10 splitters and perform the monitor function. In other embodiments, other splitters, such as 90/5 or 99/1 splitters, can be used.

In the example shown, separator plate 440 covers PCB 414 so that optical fibers in interior 375 are separated from PCB 414, as described further below. See FIG. 30.

Referring again to FIGS. 28-30, fiber optic connectors, such as example connectors 427, 462, are connected to interior-facing ports of adapters 382 of module 334 to couple adapters 382 to switches 424, 426 and splitters 426a, 426b, 426c, 426d, respectively. For example, connector 462 is connected to adapter 382 associated with source port 384 on rear face 374. In the example shown, connectors 427, 462 are SC-type connectors, although other types of connectors such as, for example, FC, ST, and LX.5 can also be used. (The other adapters 382 are shown with dust caps connected therein.)

Connector 462 includes an optical cable 464 running from connector 462 to optical switch 424. Optical switch 424 is in turn connected to splitter 426c by cable 466, and splitter 426c is connected to fiber optic connector 427 by cable 465 to complete the normal through route. Although only two connectors and associated cable are shown for purposes of clarity, connectors can be connected to each of the adapters of module 334, and cables can be used to connect the connectors to the respective switches and splitters.

In the example shown, bracket 383, adapter 382, and connector 462 can be removed from rear face 374 (see, for example, FIG. 30) so that connector 462 can be accessed by removing connector 462 from adapter 382. Optical cable 464 is looped within interior 375 of module 334 so that slack is provided when connector 462 is removed. (Although only a single loop is shown for purposes of clarity, cable 464 can be looped multiple times to provide greater amounts of slack.) For example, in one embodiment slack in cable 464 is provided so that connector 462 can be pulled approximately six inches out of module 334 so that connector 462 can be cleaned or replaced. In other embodiments, more or less slack can be provided such as, for example, three inches, nine inches, or twelve inches. Cable 465 is similarly provided with slack so that connector 427 can be removed. Cables connected to the other adapters can also be provided with slack.

Separator plate 440 generally functions to cover PCB 414 and manage the slack in the cables (e.g., cables 464, 465) away from PCB 414. In this manner, the slack in the cables is protected from contacting sharp edges or snagging on PCB 414 or any components mounted thereon.

In some embodiments, clips 470, 472 can be mounted to separator plate 440 to further manage the slack in the cables as the cables are looped within interior 375. Further, in additional circular loops, slack in the cables can also be looped in "Figure 8" configurations as well. These types of looping configurations allow the slack in the cables to be managed by separator plate 440 while maintaining the cables with proper bend radii.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A fiber optic connection panel, comprising:
   a chassis; and
   a plurality of circuit modules adapted to be mounted to the chassis, wherein each circuit module includes:
   a housing defining an interior;
   a plurality of adapters mounted on a front face and a rear face of the housing;
   a plurality of fiber optic connectors connected to interior ports defined by the adapters;
   an optical switch mounted to a printed circuit board positioned in the interior of the housing;
   a plurality of fiber optic cables connecting the fiber optic connectors to the optical switch; and
   a separator plate positioned to at least partially cover the printed circuit board;
   wherein at least some of the fiber optic cables include slack to allow the fiber optic connectors coupled thereto to be removed from the circuit module, and wherein the separator plate is positioned to separate the slack of the fiber optic cables from the printed circuit board; and
   wherein the seperator plate surrounds the printed circuit board.

2. The panel of claim 1, wherein the separator plate and an opposing wall of the housing define a space in which the fiber optic cables are managed.

3. The panel of claim 1, wherein the adapters define two input ports on the rear face of each circuit module, two output ports on the rear face of each circuit module, two input ports on the front face of each circuit module and two output ports on the front face of each circuit module.

4. The panel of claim 3, wherein the adapters further define two monitor ports on the front face of each circuit module.

5. The panel of claim 1, wherein the adapters define two input ports on the rear face of each circuit module, two output ports on the rear face of each circuit module, two input ports on the front face of each circuit module, two output ports on the front face of each circuit module, and two monitor ports on the front face of each circuit module, and wherein each circuit module further includes:
   two visual indicators on the front face of each circuit module;
   at least two switches on the front face of each circuit module; and
   a power input connector on the rear face of each circuit module;
   wherein each circuit module defines two normal through paths each linking one of the input ports on the rear face to one of the output ports on the rear face, wherein each circuit module defines patched paths each linking one of the input ports on the rear face to one of the output ports on the front face, and one of the output ports on the rear face to one of the input ports on the front face, wherein the switches on the front face operate the optical switch between the normal through paths and the patched paths, and wherein the visual indicators indicate a state of each circuit module.

6. The panel of claim 1, wherein the chassis includes a power bus, wherein the printed circuit board includes a connector edge extending through an aperture defined by the rear face of the housing of each circuit module and adapted to be connected to ports defined by the power bus, and wherein each circuit module further includes a bracket mounted to the rear face to protect the connector edge.

7. The panel of claim 6, wherein the bracket defines a plurality of members that at least partially surrounds the connector edge.

8. The panel of claim 7, wherein each of the members of the bracket extend outward from the rear face of each circuit module a distance greater than the connector edge.

9. A normal through circuit module, comprising:
a housing defining an interior;
a plurality of adapters mounted on a front face and a rear face of the housing;
a plurality of fiber optic connectors connected to interior ports defined by the adapters;
an optical switch mounted to a printed circuit board positioned in the interior of the housing;
a plurality of fiber optic cables connecting the fiber optic connectors to the optical switch; and
a separator plate positioned to at least partially cover the printed circuit board;
wherein at least some of the fiber optic cables include slack to allow the fiber optic connectors coupled thereto to be removed from the circuit module, and wherein the separator plate is positioned to separate the slack of the fiber optic cables from the printed circuit board; and
wherein the seperator plate surrounds the printed circuit board.

10. The circuit module of claim 9, wherein the separator plate and an opposing wall of the housing define a space in which the fiber optic cables are managed.

11. The circuit module of claim 9, wherein the adapters define two input ports on the rear face of the circuit module, two output ports on the rear face of the circuit module, two input ports on the front face of the circuit module, two output ports on the front face of the circuit module, and two monitor ports on the front face of the circuit module, and wherein the circuit module further includes:
two visual indicators on the front face of the circuit module;
at least two switches on the front face of each of the circuit module; and
a power input connector on the rear face of the circuit module;
wherein the circuit module defines two normal through paths each linking one of the input ports on the rear face to one of the output ports on the rear face, wherein the circuit module defines patched paths each linking one of the input ports on the rear face to one of the output ports on the front face, and one of the output ports on the rear face to one of the input ports on the front face, wherein the switches on the front face operate the optical switch between the normal through paths and the patched paths, and wherein the visual indicators indicate a state of the circuit module.

12. The circuit module of claim 9, wherein the printed circuit board includes a connector edge extending through an aperture defined by the rear face of the housing of the circuit module, and wherein the circuit module further includes a bracket mounted to the rear face to protect the connector edge.

13. A normal through circuit module, comprising:
a housing defining an interior;
a plurality of adapters mounted on a front face and a rear face of the housing;
a plurality of fiber optic connectors connected to interior ports defined by the adapters;
an optical switch mounted to a printed circuit board positioned in the interior of the housing;
a plurality of fiber optic cables connecting the fiber optic connectors to the optical switch;
a connector edge defined by a portion of the printed circuit board, wherein the connector edge is part of the printed circuit board and the printed circuit board extends to an end, and wherein the end of the printed circuit board of the connector edge extends through an aperture defined by the rear face of the housing of the circuit module; and
a bracket coupled to the rear face to protect the connector edge, the bracket including a base portion coupled to the rear face, and three members that surround the connector edge on three sides.

14. The circuit module of claim 13, wherein each of the members of the bracket extend outward from the rear face of the circuit module a distance greater than that of the connector edge.

15. The circuit module of claim 13, further comprising a separator plate positioned to at least partially cover the printed circuit board, wherein at least some of the fiber optic cables include slack to allow the fiber optic connectors coupled thereto to be removed from the circuit module, and wherein the separator plate is positioned to separate the slack of the fiber optic cables from the printed circuit board.

16. The circuit module of claim 15, wherein the separator plate and an opposing wall of the housing define a space in which the fiber optic cables are managed.

17. A normal through circuit module, comprising:
a housing defining an interior and a plurality of connector locations for receiving fiber optic connectors;
an optical switch mounted to a printed circuit board positioned in the interior of the housing;
a connector edge defined by a portion of the printed circuit board, wherein the connector edge extends through an aperture defined by a rear of the housing of the circuit module;
a bracket coupled to the rear to protect the connector edge; and
a separator plate positioned to at least partially cover the printed circuit board.

18. The circuit module of claim 17, wherein the bracket includes a base portion coupled to the rear face, and wherein the bracket defines a plurality of members that at least partially surround the connector edge, wherein each of the members of the bracket extend outward from the rear of the circuit module a distance greater than that of the connector edge.

* * * * *

UNITED STATES PATENT AND TRADEMARK OFFICE
CERTIFICATE OF CORRECTION

PATENT NO. : 7,412,147 B2
APPLICATION NO. : 11/080141
DATED : August 12, 2008
INVENTOR(S) : Scadden Page 1 of 1

It is certified that error appears in the above-identified patent and that said Letters Patent is hereby corrected as shown below:

Col. 8, line 26, claim 1: "the seperator plate" should read --the separator plate--

Col. 9, line 26, claim 9: "the seperator plate" should read --the separator plate--

Signed and Sealed this

Twenty-fourth Day of February, 2009

JOHN DOLL
*Acting Director of the United States Patent and Trademark Office*